(12) United States Patent
Nakabayashi et al.

(10) Patent No.: US 12,001,044 B2
(45) Date of Patent: Jun. 4, 2024

(54) LIGHT EMITTING MODULE AND PLANAR LIGHT SOURCE

(71) Applicant: NICHIA CORPORATION, Anan (JP)

(72) Inventors: Takuya Nakabayashi, Tokushima (JP); Daisuke Iwakura, Komatsushima (JP); Yoichi Bando, Anan (JP); Yasunori Shinomiya, Tokushima (JP); Satoshi Yoshinaga, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/046,907

(22) Filed: Oct. 14, 2022

(65) Prior Publication Data
US 2023/0116946 A1    Apr. 20, 2023

(30) Foreign Application Priority Data

Oct. 15, 2021  (JP) ................................. 2021-169249

(51) Int. Cl.
*F21V 8/00*    (2006.01)

(52) U.S. Cl.
CPC ......... *G02B 6/0045* (2013.01); *G02B 6/0055* (2013.01)

(58) Field of Classification Search
CPC .. G02B 6/0055; G02B 6/0031; G02B 6/0045; G02B 6/0068; G02B 6/0078; G02B 6/0021; G02B 6/0073; G02B 6/009; G02B 6/0091; G02B 19/0061; G02B 6/0051; G02B 6/0025; G02F 1/133603; G02F 1/133605; G02F 2203/03; F21Y 2115/10;

(Continued)

(56) References Cited

U.S. PATENT DOCUMENTS

2011/0305003 A1    12/2011 Lee et al.
2016/0223741 A1    8/2016 Lee
(Continued)

FOREIGN PATENT DOCUMENTS

CN    1475814 A  *  2/2004  ................ F21V 7/22
CN    101793381 A  *  8/2010  ............. G02B 5/045
(Continued)

OTHER PUBLICATIONS

Search English translation of CN-103307478-A (Year: 2013).*
Search English translation of CN-1475814-A (Year: 2004).*
Search English translation of CN-101793381-A (Year: 2010).*

*Primary Examiner* — Omar Rojas Cadima
(74) *Attorney, Agent, or Firm* — Global IP Counselors, LLP

(57) ABSTRACT

A light emitting module includes a light source, a light guide member, and first and second light reflective members. The light guide member is configured to transmit light from the light source. The light guide member having an upper surface and a lower surface opposite to the upper surface. The first light reflective member is arranged on a lower surface side of the light guide member. The first light reflective member has a lower surface. The first light reflective member includes a first resin, and a first reflective body having a refractive index higher than a refractive index of the first resin. The second light reflective member is arranged on a lower surface side of the first light reflective member. The second light reflective member includes a second resin, and a second reflective body having a refractive index lower than a refractive index of the second resin.

20 Claims, 14 Drawing Sheets

(58) Field of Classification Search
CPC ... F21V 13/04; F21V 7/00; F21V 5/00; F21V 7/0083; H01L 33/60; H01L 2933/0091; H01L 33/46
See application file for complete search history.

(56) References Cited

U.S. PATENT DOCUMENTS

| | | |
|---|---|---|
| 2019/0094618 A1 | 3/2019 | Kyoukane et al. |
| 2021/0247051 A1 | 8/2021 | Nakabayashi et al. |
| 2023/0060023 A1 | 2/2023 | Nakabayashi et al. |

FOREIGN PATENT DOCUMENTS

| | | | | | |
|---|---|---|---|---|---|
| CN | 103307478 A | * | 9/2013 | ............ | F21S 41/141 |
| JP | 2003-059324 A | | 2/2003 | | |
| JP | 2004-101693 A | | 4/2004 | | |
| JP | 2005070253 A | | 3/2005 | | |
| JP | 2006-039494 A | | 2/2006 | | |
| JP | 2010177130 A | | 8/2010 | | |
| JP | 2012-003263 A | | 1/2012 | | |
| JP | 2013093195 A | | 5/2013 | | |
| JP | 2016-143669 A | | 8/2016 | | |
| JP | 2017-044718 A | | 3/2017 | | |
| JP | 2017-090560 A | | 5/2017 | | |
| JP | 2019-061929 A | | 4/2019 | | |
| JP | 2021125455 A | | 8/2021 | | |
| WO | 2015182448 A1 | | 12/2015 | | |

\* cited by examiner

LIGHT EMITTING MODULE AND PLANAR LIGHT SOURCE

CROSS-REFERENCE TO RELATED APPLICATION

This application claims priority to Japanese Patent Application No. 2021-169249 filed on Oct. 15, 2021, the disclosure of which is hereby incorporated by reference in its entirety.

BACKGROUND

The present disclosure relates to a light emitting module and a planar light source.

A light emitting module that combines a light emitting element such as a light emitting diode, etc., and a light guide member is widely used in planar light sources such as liquid crystal display backlights, etc. For example, Japanese Laid-Open Patent Publication No. 2019-61929 discloses a backlight device comprising an LED substrate on which a reflective sheet and a plurality of light emitting diodes are provided, and a diffusion plate facing the LED substrate.

SUMMARY

An object of certain embodiments of the present invention is to provide a light emitting module and a planar light source in which light extraction efficiency can be improved.

According to one aspect of the present invention, a light emitting module includes a light source, a light guide member, a first light reflective member, and a second light reflective member. The light guide member is configured to transmit light from the light source. The light guide member having an upper surface and a lower surface opposite to the upper surface. The first light reflective member is arranged on a lower surface side of the light guide member. The first light reflective member has a lower surface. The first light reflective member includes a first resin, and a first reflective body having a refractive index higher than a refractive index of the first resin. The second light reflective member is arranged on a lower surface side of the first light reflective member. The second light reflective member includes a second resin, and a second reflective body having a refractive index lower than a refractive index of the second resin.

According to the light emitting module and the planar light source of an embodiment of the present invention, it is possible to improve light extraction efficiency.

DETAILED DESCRIPTION

Figure 1:
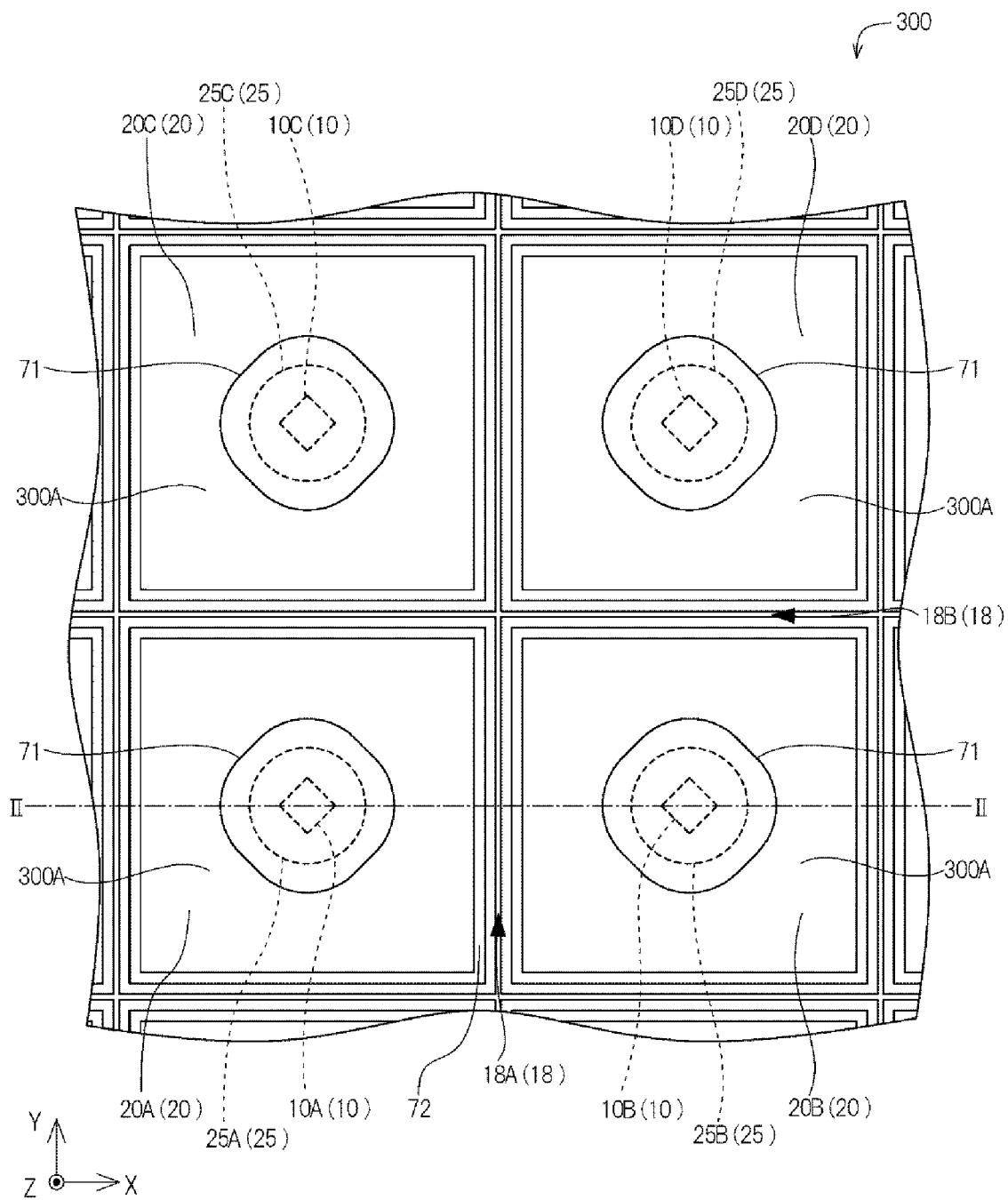
FIG. 1 is a schematic plan view of a planar light source of one embodiment of the present invention.

Certain embodiments of the present invention will be described below with reference to the drawings. Each drawing shows respective embodiment schematically, and thus the scale, the spacing, or the positional relationship of the members may be exaggerated, or an illustration of a portion of a member may be omitted. The schematic plan view showing the planar light source shown in FIG. 1, etc., is a drawing of the planar light source seen from above. In this specification, a direction indicated by the arrow of the Z axis will be referred to as an upward direction, and a direction opposite to the direction indicated by the arrow of the Z axis will be referred to as a downward direction. An end view showing only a cut surface may be used as a cross-sectional view.

In the description below, constituent elements having substantially the same function may be shown with a common reference numeral, and their repetitive explanation may be omitted. Terms indicating a specific direction or position may be used (e.g. "upper," "lower," and other terms including those terms). Those terms are used only to facilitate understanding of the relative direction and position in the referenced drawing. As long as the relative relationship of the direction or the position according to terminology such as "upper" and "lower" in the referenced drawing is consistent, corresponding arrangements in actual products, illustrations of the products, etc., do not have to be the same as the referenced drawing. In this specification, the term "parallel" includes not only cases in which two straight lines, sides, surfaces, etc., or their extensions do not intersect, but also cases in which two straight lines, sides, surfaces, etc., intersect at an angle of 10° or less. In this specification, the positional relationship expressed as "on" includes a case of being in contact with each other, and also a case of being located above another component without being in contact with each other.

Embodiments

A planar light source 300 of one embodiment will be described below with reference to FIG. 1 to FIG. 7B. Two directions that are parallel to the light emitting surface of the planar light source 300 and orthogonal to each other will be referred to as a first direction and a second direction. A direction orthogonal to the first direction and the second direction will be referred to as a third direction. In FIG. 1, the first direction is the X direction, the second direction is the Y direction, and the third direction is the Z direction.

The planar light source 300 comprises a light emitting module 100 and a support member 200. The light emitting module 100 is arranged on the support member 200. The light emitting module 100 comprises at least one light source 10, at least one light guide member 20, at least one first light reflective member 30, and at least one second light reflective member 40. In the light guide member 20, light from the light source 10 is transmitted. The light guide member 20 comprises an upper surface 21, and a lower surface 22 opposite to the upper surface 21. The first light reflective member 30 is arranged on the lower surface 22 side of the light guide member 20. The first light reflective member 30 includes a first resin 30A and a first reflective body 30B. A refractive index of the first reflective body 30B is higher than a refractive index of the first resin 30A. The second light reflective member 40 is arranged on the lower surface side of the first light reflective member 30. The second light reflective member 40 includes a second resin 40A and a second reflective body 40B. A refractive index of the second reflective body 40B is lower than the refractive index of the second resin 40A.

With the light emitting module 100 comprising the first light reflective member 30 arranged on the lower surface 22 side of the light guide member 20 and the second light reflective member 40 arranged on the lower surface side of the first light reflective member 30, light escaping toward a region below the light emitting module 100 can be reduced. Thus, the light extraction efficiency of the light emitting module 100 is improved.

Hereinafter, a detailed explanation is given for elements constituting the planar light source 300.

Light Source Part 10

In the present embodiment, the at least one light source 10 includes a first light source 10A, and a second light source 10B. The at least one light source 10 may further include a third light source 10C, and a fourth light source 10D. The second light source 10B, the third light source 10C, and the fourth light source 10D have the same structure as the first light source 10A, and accordingly their explanation will be omitted as appropriate.

Figure 3:
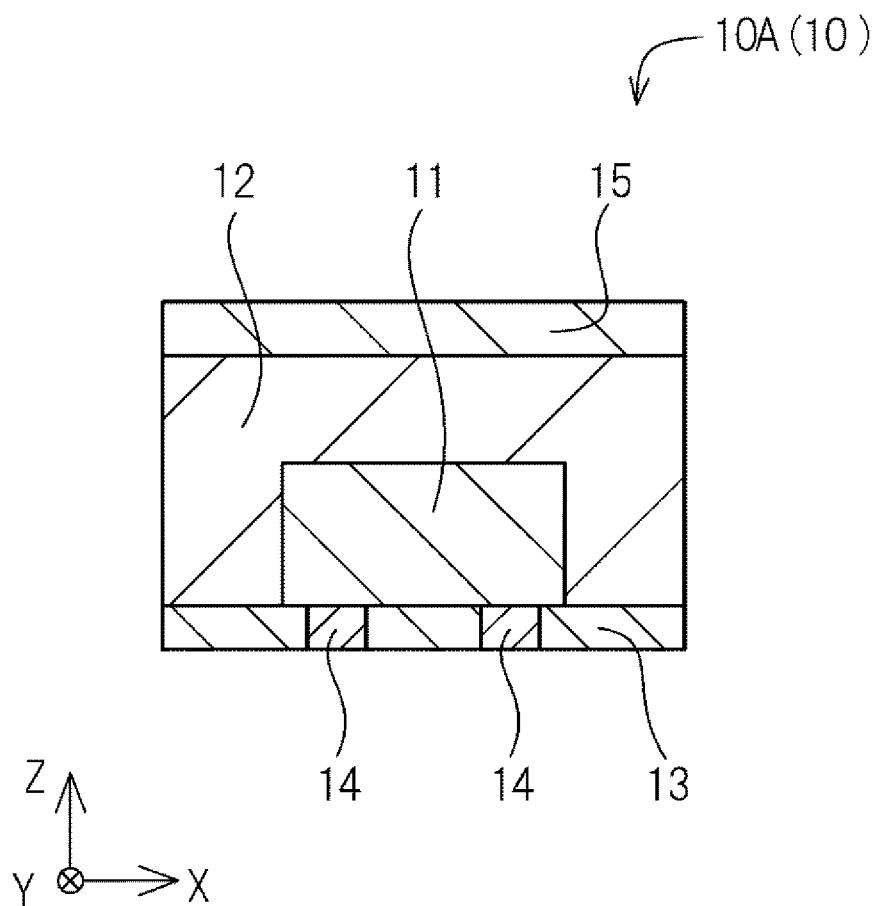
FIG. 3 is a schematic cross section view of a light source of an embodiment of the present embodiment.

As shown in FIG. 3, the first light source 10A includes a light emitting element 11. The light emitting element 11 includes a semiconductor layered structure. The semiconductor layered structure includes an n-type semiconductor layer and a p-type semiconductor layer, and a light emitting layer disposed between these. The light emitting layer may have a structure such as a double hetero junction or a single quantum well (SQW), or may have a structure having a plurality of active layers such as a multi quantum well (MQW). The semiconductor layered structure is configured to emit visible light or ultraviolet light. The semiconductor layered structure including such a light emitting layer can include $In_xAl_yGa_{1-x-y}N$ ($0 \leq x$, $0 \leq y$, $x+y \leq 1$), for example.

The semiconductor layered structure may have a structure including one or more light emitting layer between the n-type semiconductor layer and the p-type semiconductor layer, or may have a structure in which a structure including the n-type semiconductor layer, the light emitting layer, and the p-type semiconductor layer in sequence is repeated a plurality of times. When the semiconductor layered structure includes a plurality of the light emitting layers, it is possible to include light emitting layers of different light emission peak wavelengths or to include light emitting layers of the same light emission peak wavelength. The phrase "same light emission peak wavelength" as used herein includes a case when there is variation of approximately a few nanometers. The combination of light emission peak wavelengths between the plurality of light emitting layers can be selected as appropriate. For example, when the semiconductor layered structure includes two light emitting layers, it is possible to select the light emitting layers in combinations such as blue light and blue light, green light and green light, red light and red light, ultraviolet light and ultraviolet light, blue light and green light, blue light and red light, or green light and red light, etc. Each light emitting layer may include a plurality of active layers with different light emission peak wavelengths, or may include a plurality of active layers of the same light emission peak wavelengths.

As shown in FIG. 3, the first light source 10A can further include a light-transmissive member 12 (hereafter may be referred to as a light source light-transmissive member). The light source light-transmissive member 12 covers the upper surface and lateral surfaces of the light emitting element 11. The light source light-transmissive member 12 protects the light emitting element 11 and also has a function such as wavelength conversion or light diffusion depending on the particles added to the light source light-transmissive member 12.

For example, the light source light-transmissive member 12 may include a light-transmissive resin, and may further include a phosphor. As the light-transmissive resin, for example, it is possible to use silicone resin or epoxy resin, etc. Also, as the phosphor, it is possible to use an yttrium aluminum garnet based phosphor (e.g. $Y_3(Al, Ga)_5O_{12}$: Ce), a lutetium aluminum garnet based phosphor (e.g. $Lu_3(Al, Ga)_5O_{12}$; Ce), a terbium aluminum garnet based phosphor (e.g. $Tb_3(Al, Ga)_5O_{12}$; Ce), a CCA based phosphor (e.g. $Ca_{10}(PO_4)_6Cl_2$: Eu), an SAE based phosphor (e.g. $Sr_4Al_{14}O_{25}$: Eu), a chlorosilicate based phosphor (e.g. $Ca_8MgSi_4O_{16}C_{12}$: Eu), an oxynitride based phosphor such as a β-sialon based phosphor (e.g. $(Si, Al)_3(O, N)_4$: Eu) or an α-sialon based phosphor (e.g. Ca(Si, Al)$_{12}$(O, N)$_{16}$: Eu), etc., an SLA based phosphor (e.g. SrLiAl$_3$N$_4$: Eu), a nitride based phosphor such as a CASN based phosphor (e.g. CaAlSiN$_3$: Eu) or an SCASN based phosphor (e.g. (Sr, Ca)AlSiN$_3$: Eu), etc., a fluoride based phosphor such as a KSF based phosphor (e.g. K$_2$SiF$_6$: Mn), a KSAF based phosphor (e.g. K$_2$Si$_{0.99}$Al$_{0.01}$F$_{5.99}$: Mn) or an MGF based phosphor (e.g. 3.5 MgO·0.5 MgF$_2$GeO$_2$: Mn), etc., a phosphor having a Perovskite structure (e.g. CsPb (F, Cl, Br, I)$_3$), or a quantum dot based phosphor (e.g. CdSe, InP, AgInS$_2$, or AgInSe$_2$), etc.

As the phosphor added to the light source light-transmissive member 12, it is possible to use one type of phosphor or to use a plurality of types of phosphor.

As the KSAF type phosphor, it is possible to have a composition represented by formula (I) below.

$$M_2[Si_pAl_qMnrFs] \quad (I)$$

In formula (I), M represents an alkali metal, and may contain at least K. Mn may be a tetravalent Mn ion. p, q, r, and s may satisfy 0.9≤p+q+r≤1.1, 0<q≤0.1, 0<r≤0.2, 5.9≤s≤6.1. Preferably, 0.95≤p+q+r≤1.05 or 0.97≤p+q+r≤1.03, 0<q≤0.03, 0.002≤q≤0.02 or 0.003≤q≤0.015, 0.005≤r≤0.15, 0.01≤r≤0.12 or 0.015≤r≤0.1, 5.92≤s≤6.05 or 5.95≤s≤6.025 may be satisfied.

Examples include compositions represented by K$_2$[Si$_{0.946}$Al$_{0.005}$Mn$_{0.049}$F$_{5.995}$], K$_2$[Si$_{0.942}$Al$_{0.008}$Mn$_{0.050}$F$_{5.992}$], K$_2$[Si$_{0.939}$Al$_{0.014}$Mn$_{0.047}$F$_{5.986}$]. Using such a KSAF type phosphor allows for obtaining red light emission with high brightness and a light emission peak wavelength with a narrow half value width.

It is also possible to arrange a wavelength conversion sheet containing the phosphor described above on the planar light source 300. The wavelength conversion sheet can absorb a portion of the blue light from the light source 10 to emit yellow light, green light and/or red light in order to emit white light from the planar light source. For example, it is possible to obtain white light by combining the light source 10 configured to emit blue light, and the wavelength conversion sheet containing a phosphor adapted to emit yellow light. Alternatively, it is also possible to combine the light source 10 configured to emit blue light, and the wavelength conversion sheet containing a red phosphor and a green phosphor. It is also possible to combine the light source 10 configured to emit blue light with a plurality of wavelength conversion sheets. As the plurality of wavelength conversion sheets, for example, it is possible to select the wavelength conversion sheet containing a phosphor adapted to emit red light, and the wavelength conversion sheet containing a phosphor adapted to emit green light. It is also possible to combine the light source 10 having the light emitting element 11 configured to emit blue light and the light source light-transmissive member 12 containing a phosphor adapted to emit red light, and the wavelength conversion sheet containing a phosphor adapted to emit green light.

As the yellow phosphor used for the wavelength conversion sheet, for example, it is preferable to use the yttrium aluminum garnet based phosphor described above. Also, as the green phosphor used for the wavelength conversion sheet, it is preferable to use a phosphor having a Perovskite structure or a quantum dot based phosphor describe above, for example, having a narrow half value width of the light emission peak wavelength. Also, as the red phosphor used for the wavelength conversion sheet, it is preferable to use a phosphor having a light emission peak wavelength with a narrow half value width such as KSF based phosphor, the KSAF based phosphor, or the quantum dot based phosphor described above, as in the green phosphor.

The first light source 10A can further include a covering member 13. The covering member 13 is arranged on the lower surface of the light emitting element 11. The covering member 13 is arranged such that the lower surface of an electrode 14 of the first light source 10A is exposed from the covering member 13. The covering member 13 is also arranged on the lower surface of the light source light-transmissive member 12 covering the lateral surfaces of the light emitting element 11.

The covering member 13 has reflectivity with respect to light emitted by the first light source 10A. The covering member 13 is a resin containing light scattering particles, for example. As the light scattering particles of the covering member 13, for example, it is possible to use particles of titanium oxide, silicon dioxide, aluminum oxide, zinc oxide, magnesium oxide, zirconium oxide, yttrium oxide, calcium fluoride, magnesium fluoride, niobium pentoxide, barium titanate, tantalum pentoxide, barium sulfate, or glass, etc. As the resin material of the covering member 13, for example, it is possible to use a thermoplastic resin such as acrylic resin, polycarbonate resin, cyclic polyolefin resin, polyethylene terephthalate resin or polyester resin, etc., or a thermosetting resin such as epoxy resin or silicone resin, etc.

The first light source 10A includes a light adjustment member 15. The light adjustment member 15 is arranged on the upper surface of the first light source 10A. The light adjustment member 15 covers the upper surface of the light emitting element 11. The light adjustment member 15 is arranged on the upper surface of the light source light-transmissive member 12, and controls the amount and emission direction of light emitted from the upper surface of the light source light-transmissive member 12. The light adjustment member 15 has reflectivity and transmittance with respect to light emitted by the light emitting element 11. A portion of the light emitted from the upper surface of the light source light-transmissive member 12 is reflected by the light adjustment member 15, and another portion is transmitted by the light adjustment member 15. The transmittance of the light adjustment member 15 with respect to the peak wavelength of the light emitting element 11 is preferably 1% to 50%, and more preferably 3% to 30%, for example. With such a transmittance, the brightness directly above the first light source 10A is lowered, so that brightness unevenness of the light emitting module 100 is reduced.

The light adjustment member 15 can be constituted by light-transmissive resin and light scattering particles contained in the light-transmissive resin. As the light-transmissive resin, for example, it is possible to use a thermoplastic resin such as acrylic resin, polycarbonate resin, cyclic polyolefin resin, polyethylene terephthalate resin or polyester resin, etc., or a thermosetting resin such as epoxy resin or silicone resin, etc. As the light scattering particles, for example, it is possible to use particles of titanium oxide, silicon dioxide, aluminum oxide, zinc oxide, magnesium oxide, zirconium oxide, yttrium oxide, calcium fluoride, magnesium fluoride, niobium pentoxide, barium titanate, tantalum pentoxide, barium sulfate, or glass, etc. Also, the light adjustment member 15 may be a metal member such as aluminum or silver, etc., or a dielectric multilayer film, for example.

The first light source 10A does not necessarily include the covering member 13. For example, it is also possible to have the lower surface of the first light source be constituted by the lower surface of the light emitting element 11 and the lower surface of the light source light-transmissive member 12. In another mode, the first light source 10A may be constituted of the light emitting element 11 alone. In yet another mode, the first light source 10A may have a structure not including the covering member 13 and the light source light-transmissive member 12 and including the light adjustment member 15 arranged on the upper surface of the light emitting element 11. In still another mode, the first light source 10A may have a structure not including the light source light-transmissive member 12, and including the light adjustment member 15 arranged on the upper surface of the light emitting element 11 and the covering member 13 arranged on the lower surface of the light emitting element 11.

The first light source 10A may have any appropriate shape in a plan view. The shape of the first light source 10A in the plan view can be, for example, a shape such as a circle, a triangle, a quadrangle, a hexagon, or an octagon, etc. When the shape of the first light source 10A in the plan view is a quadrangle, one pair of outer edges of the first light source 10A may be parallel in the first direction (X direction), or may be inclined with respect to the first direction (X direction). In the present embodiment, the pair of outer edges of the first light source 10A is inclined by 45° with respect to the first direction (X direction).

Light Guide Member 20

The light guide member 20 is a member configured to transmit the light emitted by the light source 10. The transmittance of the light guide member 20 with respect to the peak wavelength of the light source 10 is preferably 60% or greater, and more preferably 80% or greater, for example. The light emitting module 100 may include a single light guide member 20 or a plurality of light guide members 20. In the present embodiment, the light emitting module 100 comprises a first light guide part 20A, a second light guide part 20B, a third light guide part 20C, and a fourth light guide part 20D. For example, the light guide member 20 comprises the first light guide part 20A and the second light guide part 20B adjacent to each other in the first direction (X direction). The light guide member 20 further comprises the third light guide part 20C adjacent to the first light guide part 20A, and the fourth light guide part 20D adjacent to the second light guide part 20B in the second direction (Y direction). The third light guide part 20C and the fourth light guide part 20D are adjacent to each other in the first direction (X direction).

When the planar light source 300 comprises a plurality of light sources 10, each light source 10 is demarcated by a demarcating groove 18. A single region demarcated by the demarcating groove 18 is a light emitting region 300A. In the present embodiment, the first light guide part 20A, the second light guide part 20B, the third light guide part 20C, and the fourth light guide part 20D demarcated by the demarcating groove 18 define different light emitting regions 300A. A single light emitting region 300A can serve as a drive unit for local dimming, for example. It is also possible to arrange a plurality of light sources 10 in a single light emitting region 300A demarcated by the demarcating groove 18. Any appropriate number of light emitting regions 300A may constitute the planar light source 300. For example, the planar light source 300 may comprise a single light emitting region 300A, or the planar light source 300 may comprise a plurality of light emitting regions 300A. Also, by aligning a plurality of the planar light sources 300, it is possible to have a planar light source device with a larger surface area.

As shown in FIG. 1, the light guide member 20 preferably comprises a grid shaped demarcating groove 18 constituted by a first demarcating groove 18A extending in the second direction (Y direction) and a second demarcating groove 18B extending in the first direction (X direction). In the present embodiment, the demarcating groove 18 extends from the upper surface 21 to the lower surface 22 of the light guide member 20. The demarcating groove 18 may be a recess open only to the upper surface 21 side of the light guide member 20. When the demarcating groove 18 is a recess, the demarcating groove 18 comprises a bottom surface formed by the light guide member 20. The demarcating groove 18 may be a recess that opens only to the lower surface 22 side of the light guide member 20. In the present embodiment, the first demarcating groove 18A is formed extending in the second direction (Y direction) between the first light guide part 20A and the second light guide part 20B, and the second demarcating groove 18B is formed extending in the first direction (X direction) between the first light guide part 20A and the third light guide part 20C.

As the material of the light guide member 20, for example, it is possible to use a thermoplastic resin such as acrylic, polycarbonate, cyclic polyolefin, polyethylene terephthalate or polyester, etc., a thermosetting resin such as epoxy or silicone, etc., or glass, etc.

The thickness of the light guide member 20 is preferably 150 μm or greater and 800 μm or less, for example. In this specification, the term "thickness" of each member refers to the maximum value of a length from the upper surface to the lower surface of the respective member in the third direction (Z direction). The light guide member 20 may be constituted by a single layer in the third direction or may be constituted by a laminate of a plurality of layers. When the light guide member 20 is constituted by a laminate, a light-transmissive adhesive agent may be arranged between respective layers. Respective layers of the laminate may use a different type of main material. As the material of the adhesive agent, for example, it is possible to use a thermoplastic resin such as acrylic, polycarbonate, cyclic polyolefin, polyethylene terephthalate, or polyester, etc., or a thermosetting resin such as epoxy or silicone, etc.

Figure 2:
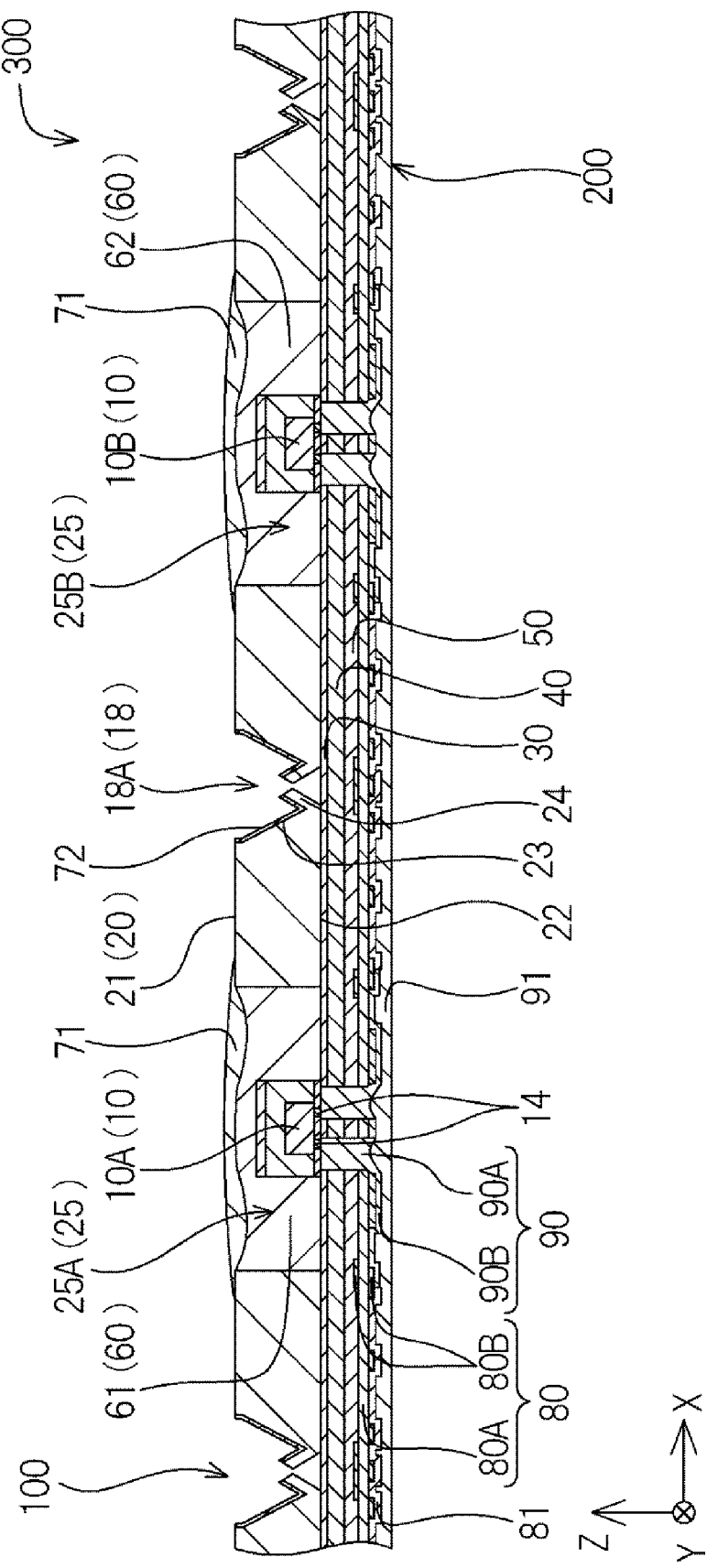
FIG. 2 is a schematic cross section view of line II-II of FIG. 1.

As shown in FIG. 2, the light guide member 20 includes the upper surface 21 serving as the light emitting surface of the planar light source 300, and the lower surface 22 positioned at the side opposite the upper surface 21. The light guide member 20 includes a lateral surface 23 positioned between the upper surface 21 and the lower surface 22. In the present embodiment, the light guide member 20 includes an extending portion 24 extending from a portion of the lateral surface 23. With the light guide member 20 comprising the extending portion 24, the extending portion 24 allows for facilitating adjustment of the brightness near the lateral surface 23. For example, it is possible to adjust the brightness by changing the direction in which the extending portion 24 extends, or the thickness of the extending portion 24, etc. The light guide member 20 does not necessarily include the extending portion 24.

In the present embodiment, the light guide member 20 includes a hole 25 in which the light source 10 is arranged. Said another way, the light source 10 is arranged inside the hole 25 of the light guide member 20. The light guide part 20A includes a first hole 25A in which the first light source 10A is arranged. The second light guide part 20B includes a second hole 25B in which the second light source 10B is arranged. The third light guide part 20C includes a third hole 25C in which the third light source 10C is arranged. The fourth light guide part 20D includes a fourth hole 25D in which the fourth light source 10D is arranged. The first hole 25A, the second hole 25B, the third hole 25C, and/or the fourth hole 25D may be referred to as the hole(s) 25. In the present embodiment, the hole 25 is a through hole extending from the upper surface 21 to the lower surface 22 of the light guide member 20. The hole 25 may be a recess opened only at the lower surface 22 side of the light guide member 20. When the hole 25 is a recess, the hole 25 comprises a bottom surface of the recess formed by the light guide member 20.

As shown in FIG. 1, the hole 25 in the present embodiment is a circular shape in the plan view. The hole 25 in the plan view may also be an oval, or a polygonal shape such as a triangle, a quadrangle, a hexagon, or an octagon, etc., for example.

Figure 4A:
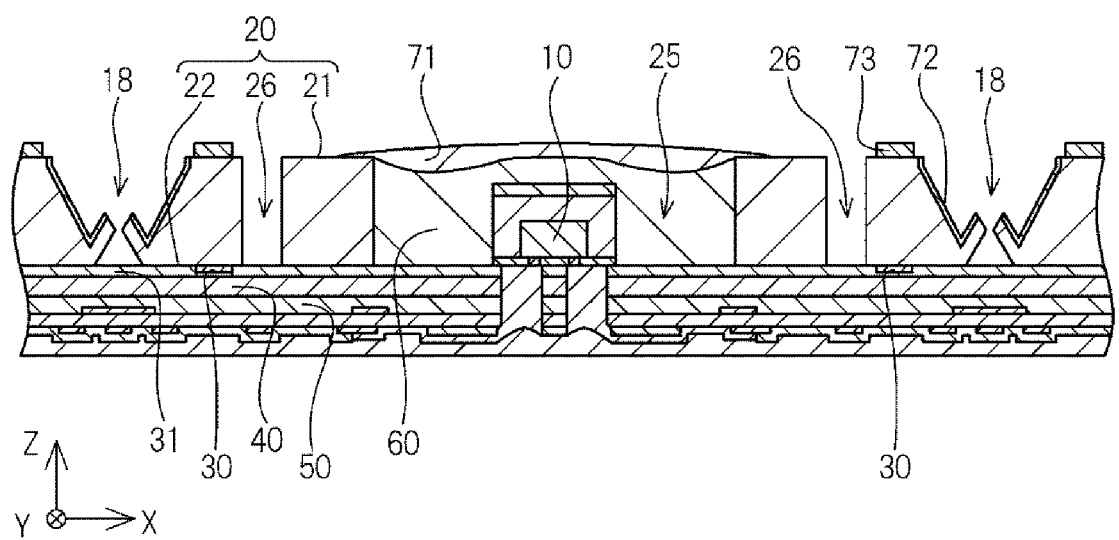
FIG. 4A is a schematic cross section view of the planar light source of another embodiment of the present invention.
Figure 4B:
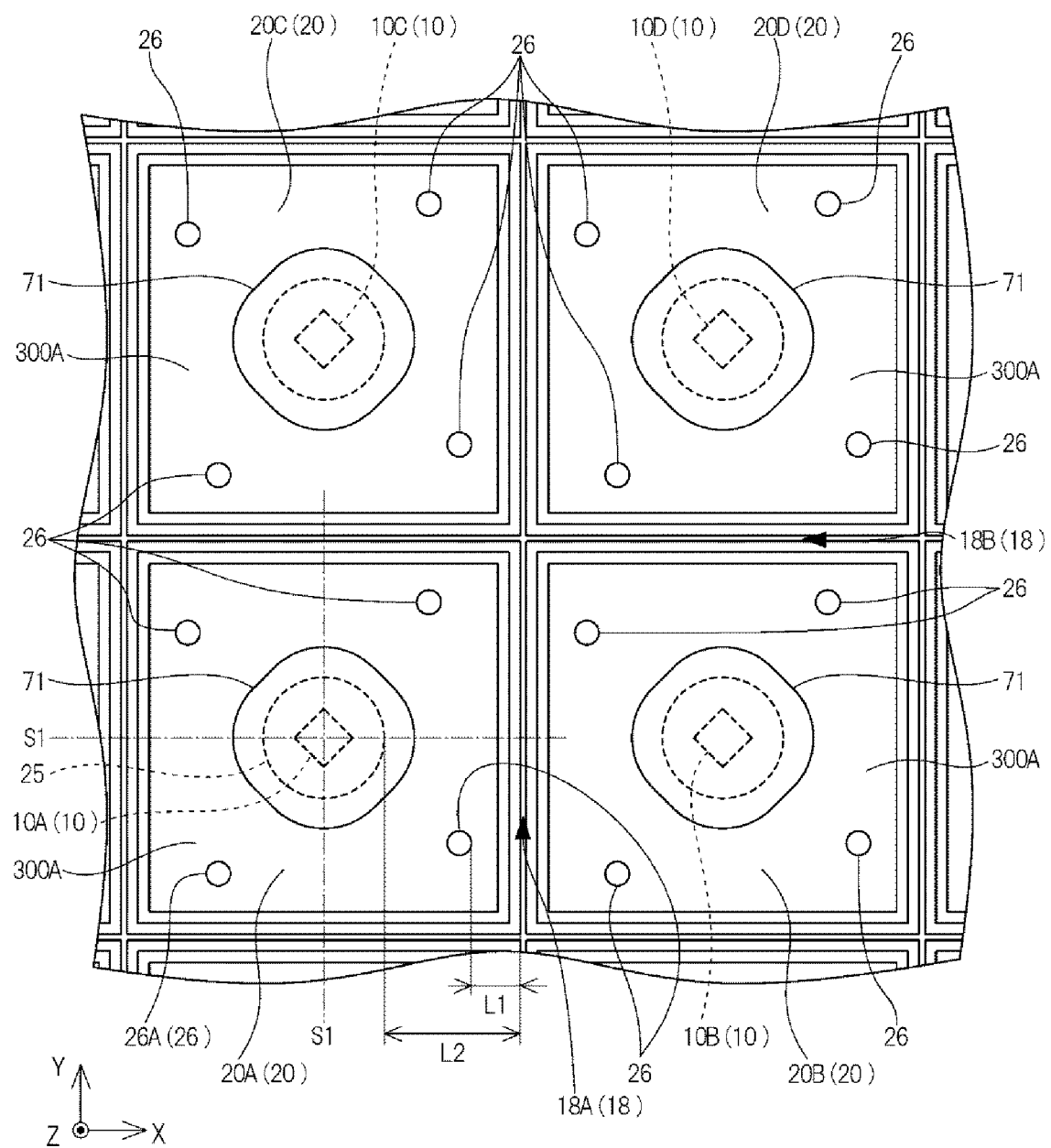
FIG. 4B is a schematic plan view of the planar light source of another embodiment of the present invention.

As shown in FIG. 4A, the light guide member 20 in another embodiment may have a light guide hole 26. As shown in FIG. 4B, in the plan view, a minimum distance L1 from an outer edge of the light guide hole part 26 to a corresponding outer edge of the demarcating groove 18 is shorter than a minimum distance L2 from an outer edge of the hole 25 to a corresponding outer edge of the demarcating groove 18. In the present embodiment, the light guide hole part 26 extends from the upper surface 21 to the lower surface 22 of the light guide member 20. The light guide hole part 26 may also be a recess open only at the upper surface 21 side of the light guide member 20. The light guide hole part 26 may also be a recess open only at the lower surface 22 side of the light guide member 20. With the light guide member 20 having the light guide hole part 26, it is possible to make the surface area of the light guide member 20 larger. Accordingly, it is possible to increase the light extracted from the surface of the light guide member 20 to outside the light guide member 20. This can facilitate adjustment in brightness, which can facilitate reduction in brightness unevenness of the light emitting module 100.

The light guide hole part 26 may have any appropriate shape in a plan view. As shown in FIG. 4A, the shape of the light guide hole part 26 in the plan view may be a circle. In the plan view, the shape of the light guide hole part 26 may also be an oval or a polygon such as a triangle, a quadrangle, a hexagon, or an octagon, etc. For example, in the plan view, the light guide hole part 26 may have a V shape extending in two directions. It is also possible to combine a plurality of light guide hole parts of different shapes in the plan view. For example, it is possible to combine a circular light guide hole part and a V-shaped light guide hole part.

Figure 4C:
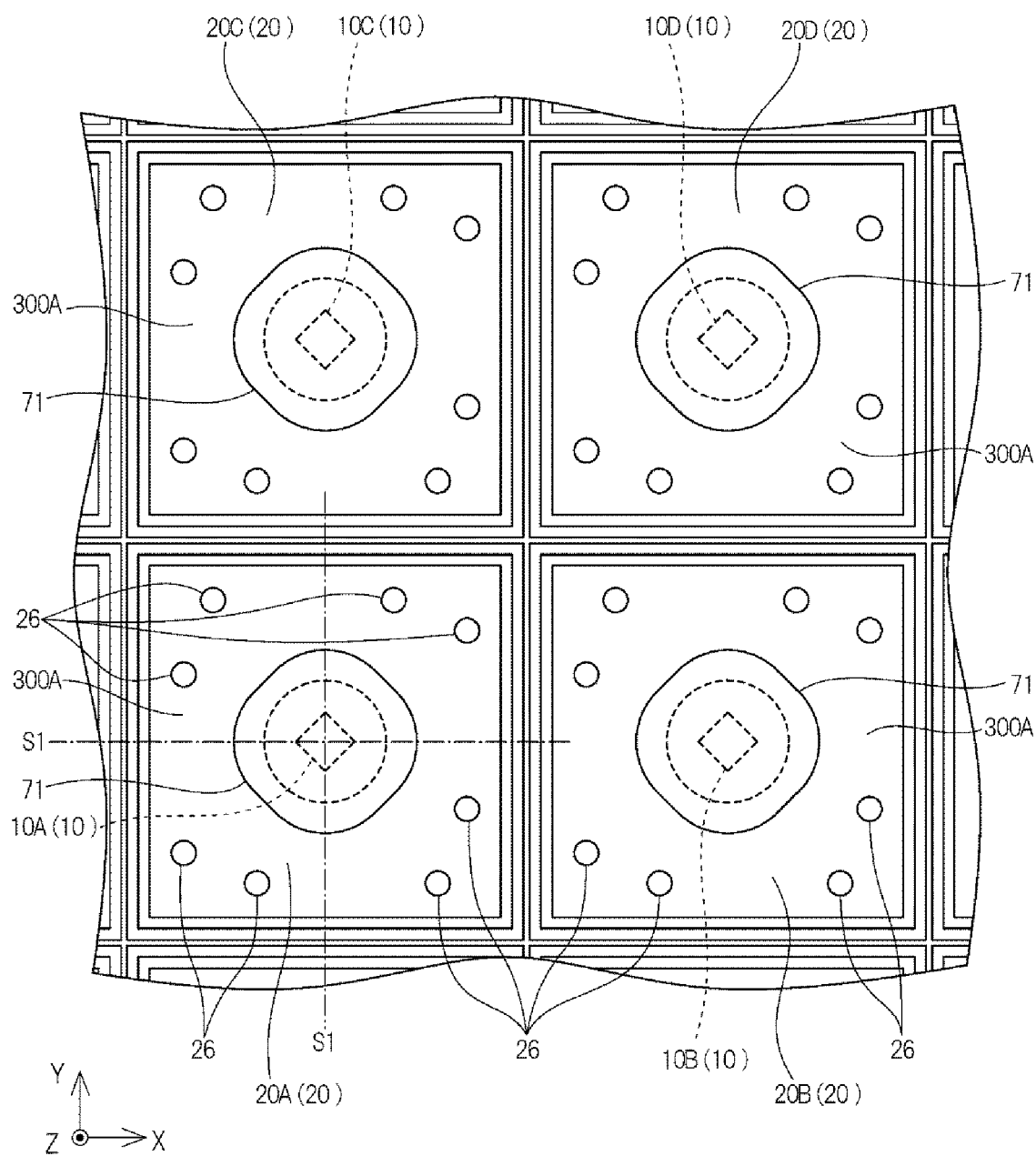
FIG. 4C is a schematic plan view of the planar light source of another embodiment of the present invention.
Figure 4D:
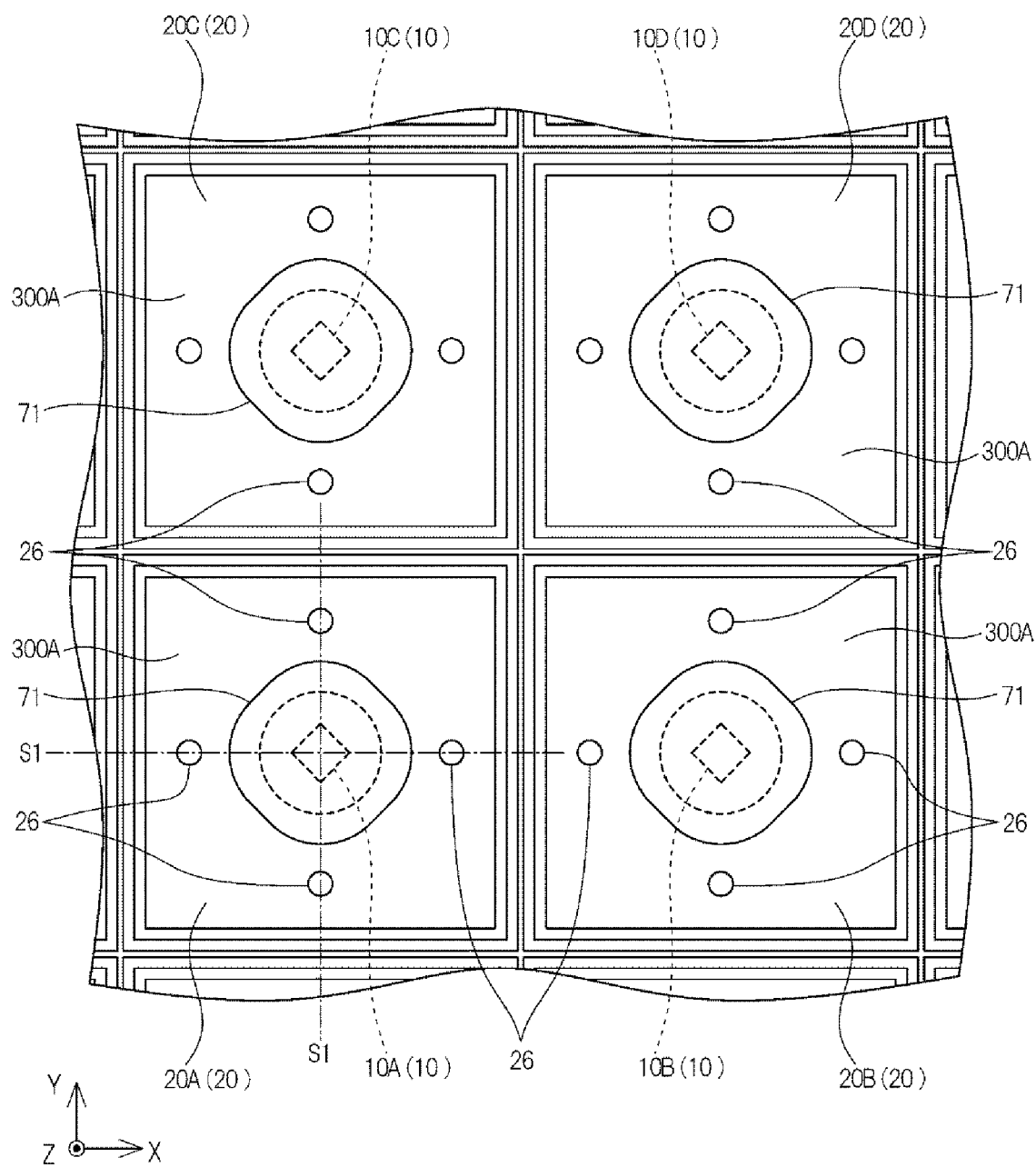
FIG. 4D is a schematic plan view of the planar light source of another embodiment of the present invention.

As shown in FIG. 4B, 4C, it is preferable that the plurality of light guide hole parts 26 positioned inside a single light emitting region 300A are formed to be asymmetrical with respect to a virtual straight line Si passing through the center of the light source 10 and parallel to the first direction (X direction) or the second direction (Y direction). With this structure, inside a single light emitting region 300A, regions in which the brightness is increased due to the light guide hole part 26 can be prevented from overlapping in the first direction (X direction) or the second direction (Y direction). Accordingly, it is possible to reduce brightness unevenness of the light emitting module 100. In this specification, the term "center" means the centroid of each part in the plan view. In this specification, one of the plurality of light guide hole parts 26 formed on the upper surface 21 of the first light guide part 20A is referred to as a "first light guide hole part 26A". It is preferable that the center of the first light guide hole part 26A does not overlap with any of the centers of all the other light guide hole parts 26 formed on the upper surface of the first light guide part 20A in the first direction (X direction) and/or the second direction (Y direction). With this structure, inside a single light emitting region 300A, regions in which the brightness is increased due to the light guide hole part 26 can be prevented from overlapping in the first direction (X direction) and/or the second direction (Y direction). It is preferable that the first light guide hole part 26A does not overlap with any of all the other light guide hole parts 26 formed on the upper surface of the first light guide part 20A in the first direction (X direction) and/or the second direction (Y direction). With this structure, inside one light emitting region 300A, regions in which the brightness is increased due to the light guide hole part 26 can be further prevented from overlapping in the first direction (X direction) and/or the second direction (Y direction). As shown in FIG. 4D, a plurality of the light guide hole parts 26 positioned inside a single light emitting region 300A may be formed to be symmetrical with respect to the virtual straight line S1 that passes through the center of the light source 10 and is parallel to the first direction (X direction) or the second direction (Y direction).

First Light Reflective Member 30

The first light reflective member 30 is a member having reflectivity with respect to light emitted by the light source 10. The reflectance of the first light reflective member 30 is preferably 60% or greater, and more preferably 80% or greater, for example. In this specification, the term "reflectance" refers to a reflectance with respect to the peak wavelength of the light source 10. As shown in FIG. 2, the first light reflective member 30 is arranged on the lower surface 22 side of the light guide member 20. The first light reflective member 30 is arranged to face at least a portion of the lower surface of the light guide member 20. The first light reflective member 30 preferably is arranged facing a region from the lower surface of the light guide member 20 to the lower surface of the light source 10. This structure allows for reducing light escaping toward a region below the light emitting module 100.

Figure 5:
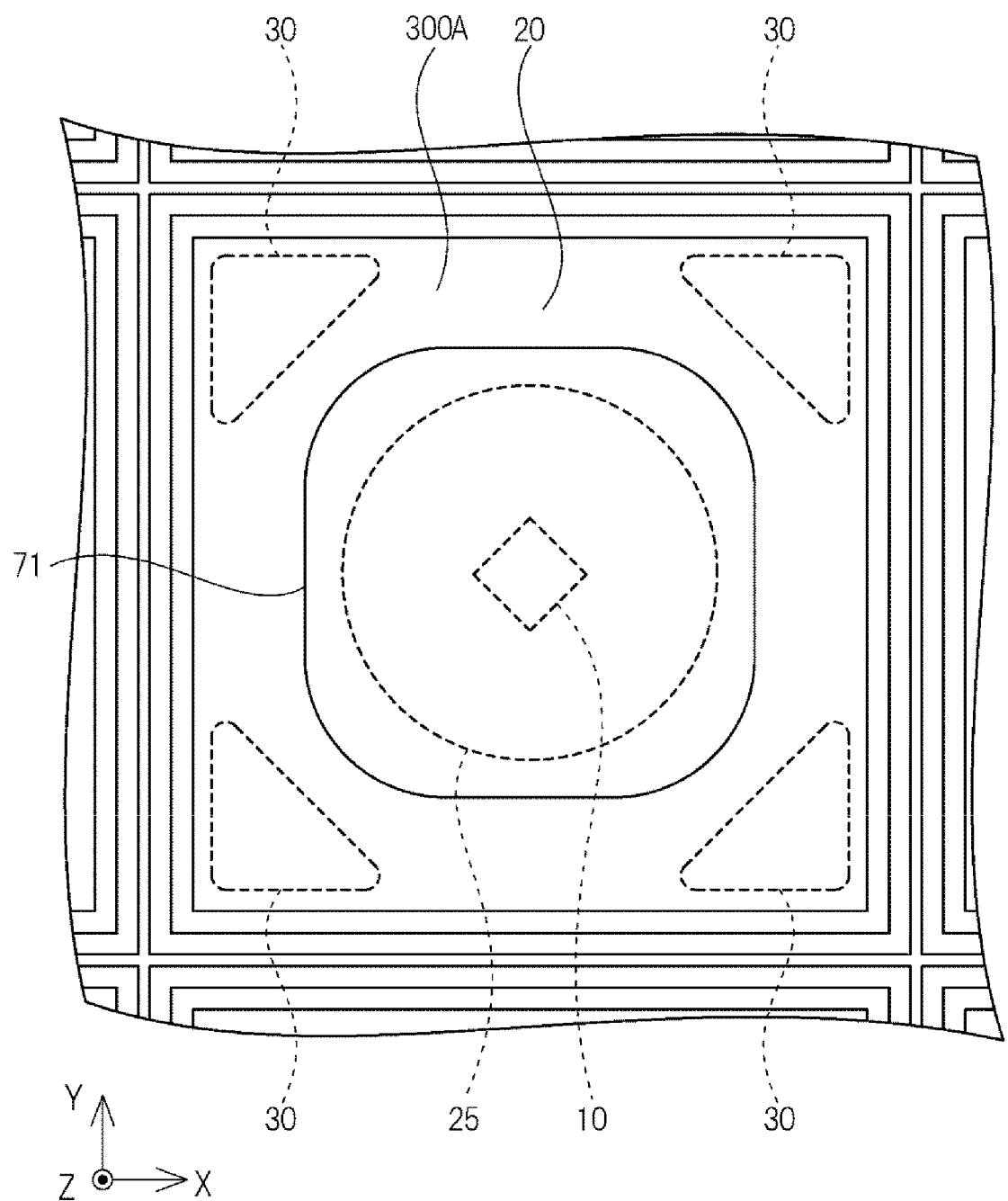
FIG. 5 is a schematic plan view of the planar light source of another embodiment of the present invention.

As shown in FIG. 5, it is preferable that the first light reflective member 30 be positioned between the light source 10 and a portion of an outer edge of the light guide member 20 farthest from the light source 10 in the plan view. Brightness tends to be lower in a portion of the light guide member 20 farthest from the light source 10. Accordingly, with the first light reflective member 30 positioned between the light source 10 and a portion of an outer edge of the light guide member 20 farthest from the light source 10, increase in the brightness near the outer edge of the light guide member 20 farthest from the light source 10 can be facilitated. Thus, brightness unevenness of the light emitting module 100 is reduced. When the light guide member 20 comprises a plurality of the light guide members such as the first light guide part 20A and the second light guide part 20B, etc., in the plan view, it is preferable that the first light reflective member 30 be positioned between the first light source 10A and a portion of an outer edge of the first light guide part 20A farthest from the first light source 10A. With this structure, brightness unevenness inside a single light emitting region 300A can be reduced. As shown in FIG. 5, when the outer edges of the first light guide part 20A form a quadrangular shape, in the plan view, it is preferable that the first light reflective member 30 be positioned between the first light source 10A and a corner formed by outer edges of the first light guide part 20A. When the outer edges of the first light guide part 20A forms a polygonal shape such as a tringle, a hexagon or an octagon, etc., as well, in the plan view, it is preferable that the first light reflective member 30 be positioned between the first light source 10A and a corner of formed by outer edges of the first light guide part 20A.

Figure 6A:
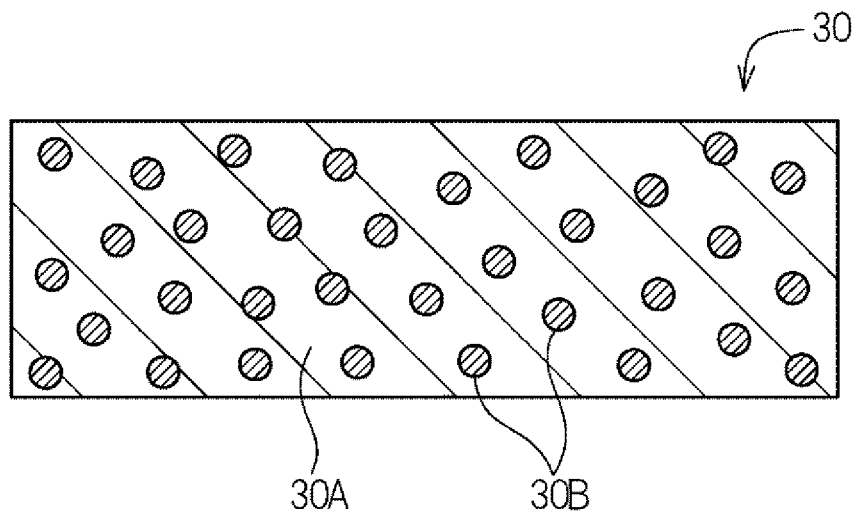
FIG. 6A is a schematic cross section view of a first light reflective member of one embodiment of the present invention.

As shown in FIG. 6A, the first light reflective member 30 includes the first resin 30A and the first reflective body 30B. The refractive index of the first reflective body 30B is higher than the refractive index of the first resin 30A. The light incident in the first resin 30A is diffuse-reflected by the first reflective body 30B, which allows for reducing light escaping toward a region below the light emitting module 100. Examples of a material of the first resin 30A include acrylic resin, silicone resin, urethane resin, epoxy resin, phenol resin, BT resin, polyimide resin, and unsaturated polyester resin, etc. Examples of a material of the first reflective body 30B include particles of titanium oxide. Other examples of a material of the first reflective body 30B include particles of aluminum oxide, zinc oxide, magnesium oxide, zirconium oxide, yttrium oxide, niobium pentoxide, barium titanate, tantalum pentoxide, barium sulfate, etc.

It is preferable that the first light reflective member 30 have adhesiveness. Accordingly, it is possible to have the first light reflective member 30 and the second light reflective member 40 be in contact and fixed. This allows reduction in size of the light emitting module 100 in the third direction (Z direction). When the first light reflective member 30 does not have adhesiveness, as shown in FIG. 4A, it is also possible to arrange an adhesive member 31 between the first light reflective member 30 and the second light reflective member 40 to fix the first light reflective member 30 and the second light reflective member 40. The adhesive member 31 preferably covers an entirety of the lower surface of the first light reflective member 30. With this structure, the first light reflective member 30 and the second light reflective member 40 can be less easily detached from each other.

The refractive index of the first resin 30A is preferably lower than the refractive index of the light guide member 20. With this structure, a portion of the light that advances from the light guide member 20 to the first light reflective member 30 is totally reflected in the interface of the first resin 30A and the light guide member 20. Thus, light escaping toward a region below the light emitting module 100 can be reduced.

The first light reflective member 30 is preferably a member with a small change in the elastic modulus with respect to temperature changes of from 25° C. to 100° C. For example, the change in elastic modulus of the first light reflective member 30 is preferably 60% or less at 60° C. and 80% or less at 100° C. with respect to the elastic modulus at 25° C. In particular, the elastic modulus of the first light reflective member 30 at 100° C. is preferably 10000 Pa to 50000 Pa, and more preferably 20000 Pa to 40000 Pa. Using such a member allows for reducing shifting in the position of the first light reflective member 30 with respect to the light guide member 20 due to heating to harden the electrically conductive paste arranged inside a through hole 301 such as that shown in FIG. 9E, for example. Accordingly, it is possible to prevent occurrence of cracks in the hardened electrically conductive paste (second electrically conductive member 90).

Second Light Reflective Member 40

The at least one second light reflective member 40 is a member having reflectivity with respect to light emitted by the light source 10. The reflectance of the second light reflective member 40 is preferably 60% or greater, and more preferably 80% or greater, for example.

The second light reflective member 40 is arranged on the lower surface side of the first light reflective member 30. The second light reflective member 40 is arranged to face at least a portion of the lower surface of the first light reflective member 30. The second light reflective member 40 is preferably arranged to face the entire lower surface of the first light reflective member 30. This structure allows for reducing light escaping toward a region below the light emitting module 100.

Figure 6B:
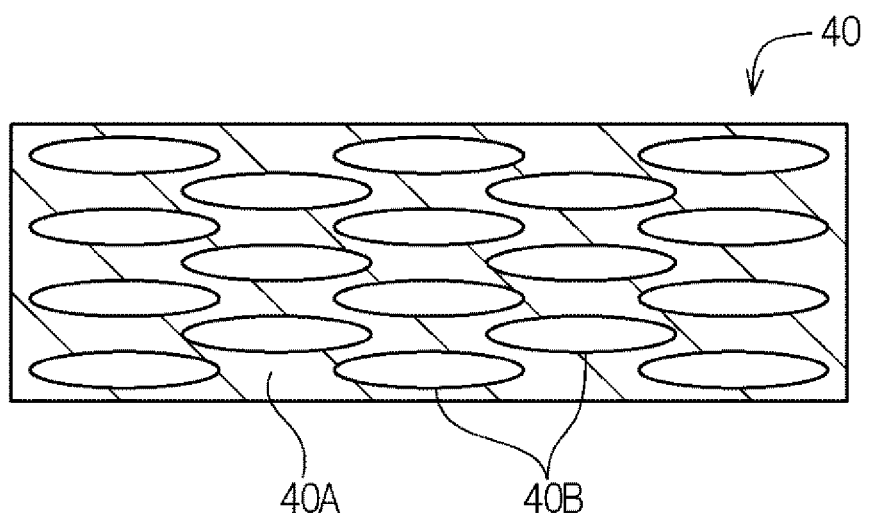
FIG. 6B is a schematic cross section view of a second light reflective member of one embodiment of the present invention.

As shown in FIG. 6B, the second light reflective member 40 includes the second resin 40A and the second reflective body 40B. The refractive index of the second reflective body 40B is lower than the refractive index of the second resin 40A. As the material of the second resin 40A, examples include polyethylene terephthalate (PET) resin, olefin resin, acrylic resin, silicone resin, urethane resin, or epoxy resin, etc. An example of the second reflective body 40B is a gas such as air, etc. Other examples of a material of the second reflective body 40B include particles of silicon dioxide, calcium fluoride, or magnesium fluoride, etc. The second light reflective member 40 may include or may not include a reflective body with a higher refractive index than the second resin 40A. With the second light reflective member 40 including a reflective body with a higher refractive index than the second resin 40A, it is possible to further reduce light escaping toward a region below the light emitting module 100.

The second light reflective member 40 preferably includes the light-transmissive second resin 40A and the second reflective body 40B with a lower refractive index than the second resin 40A. With this structure, a portion of the light incident on the second resin 40A is totally reflected at the interface between the second resin 40A and the second reflective body 40B. Using such total reflection in the second light reflective member 40, it is easier to guide light to a region more distant from the light source 10. Accordingly, even if the distance from the light source 10 to the end part of each light emitting region 300A (demarcating groove 18) is increased, it is easier to transmit light to the entirety of the light emitting region 300A. Thus, it is possible to reduce brightness unevenness inside each light emitting region 300A. Also, with the first light reflective member 30 being arranged on the upper surface side of the second light reflective member 40, it is possible to reduce brightness unevenness of the light emitting module 100. For example, in the present embodiment, the light guide member 20 is not positioned above a portion of the first light reflective member 30 and a portion of the second light reflective member 40 that correspond to the demarcating groove 18, so that a portion of the light emitted from the first light reflective member 30 is extracted to outside the light emitting module 100 without being guided to the light guide member 20. Thus, the brightness may be increased in the region near the demarcating groove 18. With the first light reflective member 30 being arranged on the upper surface side of the second light reflective member 40, a portion of the light guided to a region near the demarcating groove 18 inside the second light reflective member 40 is diffuse-reflected by the first light reflective member 30. Accordingly, the brightness in the region near the demarcating groove 18 can be prevented from being excessively high. In the present embodiment, by the first light reflective member 30 and the second light reflective member 40 with differing reflection characteristics being combined, it is possible to reduce brightness unevenness of the light emitting module 100 while ensuring light guide properties within the light guide plate 10.

The thickness of the second light reflective member 40 is preferably greater than the thickness of the first light reflective member 30. With this structure, using total reflection in the second light reflective member 40, it is possible to make it easier to guide light to regions at a further distance from the light source 10. For example, the thickness of the first light reflective member 30 is 10 µm to 50 µm. For example, the thickness of the second light reflective member 40 is 40 µm to 200 µm.

The refractive index of the second resin 40A is preferably higher than the refractive index of the first resin 30A. This allows for increasing the difference in the refractive index between the second resin 40A and the second reflective body 40B. Accordingly, a portion of the light that advances from the second resin 40A to the second reflective body 40B can be facilitated to be totally reflected at the interface between the second resin 40A and the second reflective member 40B. This allows for facilitating guiding of light to regions at a further distance from the light source 10. Facilitating total reflection at the interface between the second resin 40A and the second reflective body 40B, allows for facilitating reduction in escape of light toward a region below the light emitting module 100.

The refractive index of the first resin 30A, the first reflective body 30B, the second resin 40A, or the second reflective body 40B in the present embodiment is measured using an Abbe refractometer, etc., for example, or can be estimated from a composition identified using Fourier transform infrared spectrometry, etc. The refractive index of the first resin 30A or the second resin 40A can also be estimated by arranging the first resin 30A or the second resin 40A in a liquid having a specific refractive index (hereafter called a refractive liquid), and using an optical microscope to observe the presence of an interface between the first resin 30A or the second resin 40A and the refractive liquid. Specifically, the refractive index of the first resin 30A or the second resin 40A can be estimated to be close to the refractive index of the refractive liquid when an interface with the refractive liquid cannot be seen (or is difficult to see). When the first resin 30A, the first reflective body 30B, the second resin 40A, or the second reflective body 40B is a commercial product, it is possible to use the catalog value for their refractive indices. Measurement or estimation of the refractive index can be done using the same method for a third resin 50A or a third reflective body 50B, etc., described later.

Third Light Reflective Member 50

The light emitting module 100 may further comprise at least one third light reflective member 50. The third light reflective member 50 is a member having reflectivity with respect to the light emitted by the light source 10. The reflectance of the third light reflective member 50 is preferably 60% or greater, and more preferably 80% or greater, for example.

The third light reflective member 50 is arranged on the lower surface side of the second light reflective member 40. The third light reflective member 50 is arranged to face at least a portion of the lower surface of the second light reflective member 40. The third light reflective member 50 is preferably arranged facing the entire lower surface of the second light reflective member 40. With this structure, light escaping toward a region below the light emitting module 100 can be reduced.

Figure 6C:
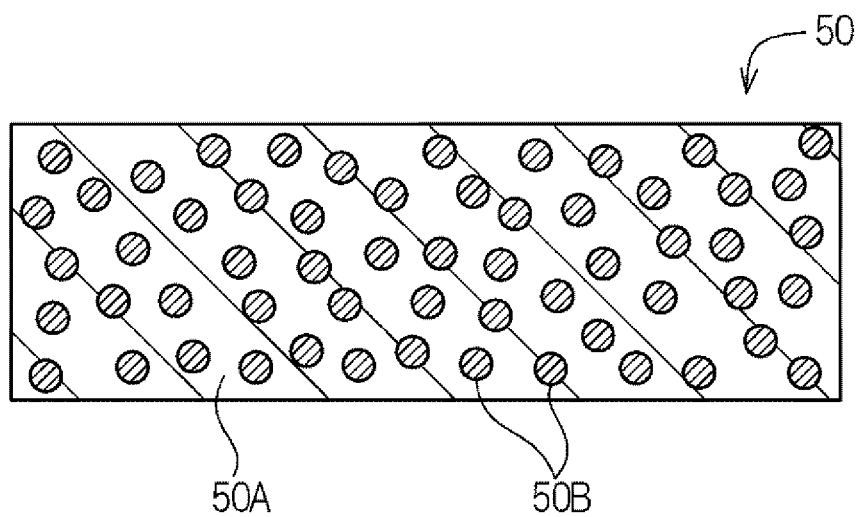
FIG. 6C is a schematic cross section view of a third light reflective member of one embodiment of the present invention.

As shown in FIG. 6C, the third light reflective member 50 includes the third resin 50A and the third reflective body 50B. The refractive index of the third reflective body 50B is higher than the refractive index of the third resin 50A. The light incident on the third resin 50A is diffuse-reflected by the third reflective body 50B, which allows for reducing escape of light toward a region below the light emitting module 100. Examples of a material of the third resin 50A include acrylic resin, silicone resin, urethane resin, epoxy resin, phenol resin, BT resin, polyimide resin, or unsaturated polyester resin, etc. Examples of a material of the third reflective body 50B include particles of titanium oxide, for example. Other examples of a material of the third reflective body 50B include particles of aluminum oxide, zinc oxide, magnesium oxide, zirconium oxide, yttrium oxide, niobium pentoxide, barium titanate, tantalum pentoxide, barium sulfate, etc.

The third light reflective member 50 preferably has adhesiveness. This allows the third light reflective member 50 and the second light reflective member 40 to be secured together in contact with each other. This allows for facilitating reduction in size of the light emitting module 100 in the third direction (Z direction). When the third light reflective member 50 does not have adhesiveness, an adhesive member can be arranged between the third light reflective member 50 and the second light reflective member 40 to secure the third light reflective member 50 and the second light reflective member 40 together.

The concentration of the third reflective body 50B in the third light reflective member 50 is preferably higher than the concentration of the first reflective body 30B in the first light reflective member 30. With this structure, it is possible to increase the reflectance of the third light reflective member 50, so that light escaping toward a region below the light emitting module 100 can be reduced. Reduction in light escaping toward a region below the light emitting module 100 allows for reducing degradation of the support member 200. With the concentration of the first reflective body 30B in the first light reflective member 30 lower than the concentration of the third reflective body 50B in the third light reflective member 50, it is possible to increase the light transmitted through the first light reflective member 30 and made incident on the second light reflective member 40. With the high reflectance of the third light reflective member 50, light entering the third light reflective member 50 from the second light reflective member 40 can be facilitated to be diffuse-reflected at the third reflective body 50B of the third light reflective member 50. A portion of the light diffuse-reflected at the third reflective body 50B of the third light reflective member 50 is incident on the second light reflective member 40, which allows increase in the amount of light guided to inside the second light reflective member 40. Thus, using total reflection in the second light reflective member 40, it is possible to increase the amount of light guided to regions farther from the light source 10, allowing for reduction in brightness unevenness of the light emitting module. Examples of the material of the first reflective body and the third reflective body include titanium oxide.

The thickness of the third light reflective member 50 is preferably greater than the thickness of the first light reflective member 30. This allows for increasing the reflectance of the third light reflective member 50. The thickness of the third light reflective member 50 is 30 µm to 100 µm, for example. The thickness of the second light reflective member 40 is preferably greater than the thickness of the third light reflective member 50. This can facilitate guiding light to regions more distant from the light source 10 using total reflection in the second light reflective member 40.

Light-Transmissive Member 60

The light emitting module 100 may further comprise at least one light-transmissive member 60. The light-transmissive member 60 is transmissive to light emitted by the light source 10. The transmittance of the light-transmissive member 60 with respect to the peak wavelength of the light source 10 is preferably 60% or greater, and more preferably 80% or greater, for example. As the material of the light-transmissive member 60, it is possible to use resin, for example. As the material of the light-transmissive member 60, it is possible to use the same resin as the material of the light guide member 20, or a resin with a small difference in refractive index from the material of the light guide member 20.

Figure 7A:
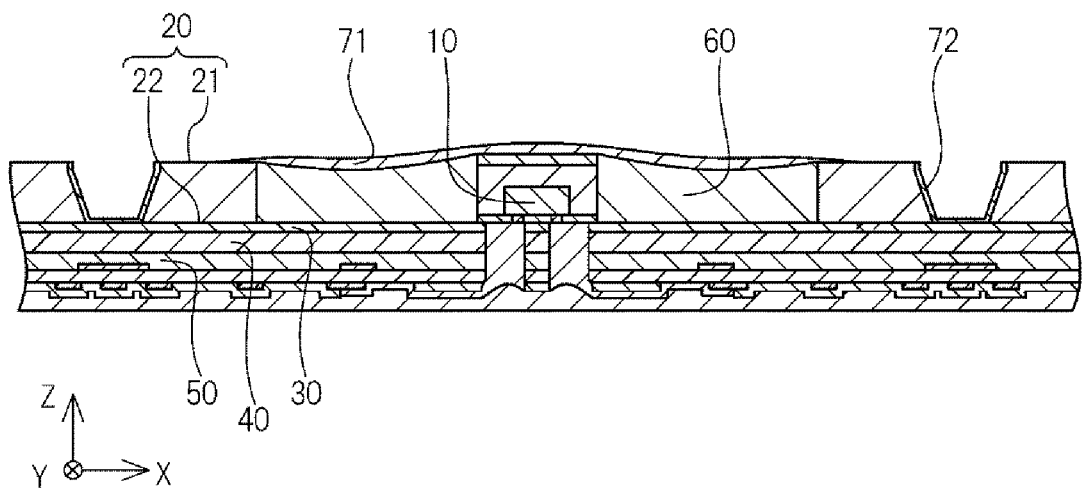
FIG. 7A is a schematic cross section view of the planar light source of another embodiment of the present invention.
Figure 7B:
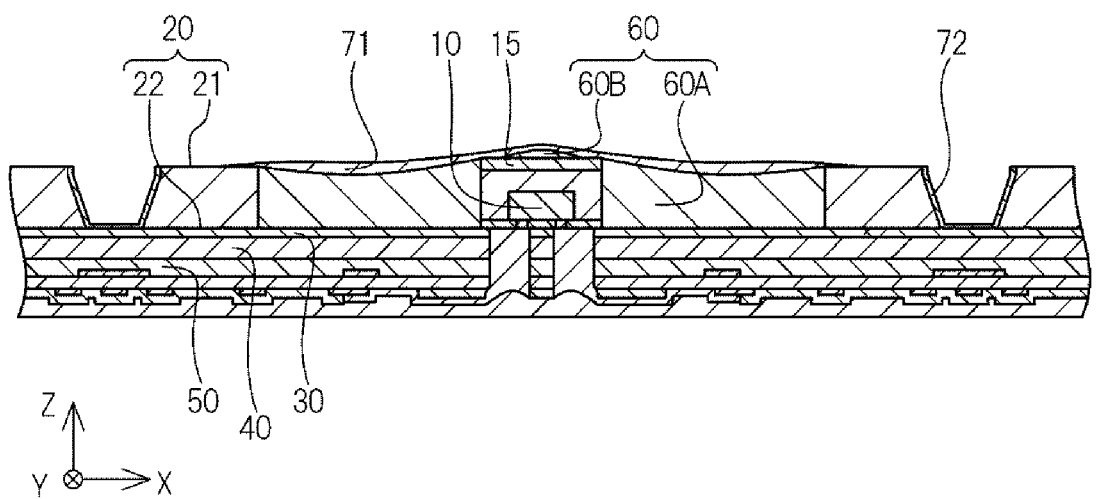
FIG. 7B is a schematic cross section view of the planar light source of another embodiment of the present invention.

The light-transmissive member 60 is arranged inside the hole 25 and covers the light source 10. A single light-transmissive member 60 or a plurality of the light-transmissive members 60 may be employed. As shown in FIG. 2, the at least one light-transmissive member 60 in the present embodiment includes a first light-transmissive member 61 arranged inside the first hole 25A and covering the first light source 10A, and a second light-transmissive member 62 arranged inside the second hole 25B and covering the second light source 10B. The at least one light-transmissive member 60 further includes a third light-transmissive member covering the third light source 10C, and a fourth light-transmissive member covering the fourth light source 10D. The light-transmissive member 60 is arranged between inner lateral surfaces defining the hole 25 and the lateral surfaces of the light source 10. The light-transmissive member 60 is preferably in contact with the light source 10 and the light guide member 20. This structure allows for facilitating light from the light source 10 to be guided to the light guide member 20. As shown in FIG. 2, the light-transmissive member 60 may also be arranged on the upper side of the light source 10. Accordingly, the light-transmissive member 60 covers the upper surface of the light source 10, so that it is possible to reduce brightness unevenness of the region directly above the light source 10. For example, with the light-transmissive member 60 covering the upper surface of the light source 10, a portion of the light from the light source 10 is diffuse-reflected by the first light reflective member 30, etc., and the light is guided to the portion of the light-transmissive member 60 covering the upper surface of the light source 10. This allows for preventing the region directly above the light source 10 from becoming excessively bright or excessively dark. As shown in FIG. 7A, in one example, the light-transmissive member 60 is not arranged on the upper surface of the light source 10. With this structure, it is possible to make the light emitting module 100 smaller in the third direction (Z direction). As shown in FIG. 7B, the light-transmissive member 60 may also comprise a first light-transmissive part 60A covering the lateral surface of the light source 10, and a second light-transmissive part 60B covering a portion of the upper surface of the light source 10. The first light-transmissive part 60A and the second light-transmissive part 60B are positioned apart from each other. The entire surface of the second light-transmissive part 60B is covered by a fourth light reflective member 71 described later and the light adjustment member 15 of the light source 10. With this structure, the light incident on the second light-transmissive part 60B is reflected by the fourth light reflective member 71 and the light adjustment member 15, so it is difficult to be extracted to outside the light emitting module 100. Thus, it is possible to suppress the region directly above the light source 10 from becoming too bright. With the light-transmissive member 60 covering at least a portion of the upper surface of the light source 10, it is possible to protect the light source 10 using the light-transmissive member 60. The shape of the upper surface of the second light-transmissive part 60B in the cross section view is curved to be convex upward.

The light-transmissive member 60 may be constituted by a single layer or be constituted by a laminate of a plurality of layers in the third direction (Z direction). The light-transmissive member 60 may also include phosphor or light scattering particles. When the light-transmissive member 60 is a laminate, each layer may include or may not include phosphor and/or light scattering particles. For example, the light-transmissive member 60 may be constituted by layers that do include phosphor and layers that do not include phosphor.

Fourth Light Reflective Member 71

As shown in FIG. 2, the light emitting module 100 in the present embodiment further comprises at least one fourth light reflective member 71. The light emitting module 100 does not necessarily comprise the fourth light reflective member 71. The fourth light reflective member 71 is a member configured to reflect light emitted by the light source 10. The reflectance of the fourth light reflective member 71 is preferably 60% or greater, and more preferably 80% or greater, for example.

The fourth light reflective member 71 includes a fourth resin and a fourth reflective body. As the material of the fourth resin, it is possible to use a thermoplastic resin such as acrylic resin, polycarbonate resin, cyclic polyolefin resin, polyethylene terephthalate resin or polyester resin, etc., or a thermosetting resin such as epoxy resin or silicone resin, etc., for example. As the material of the fourth reflective body, it is possible to use particles such as of titanium oxide, silicon dioxide, aluminum oxide, zinc oxide, magnesium oxide, zirconium oxide, yttrium oxide, calcium fluoride, magnesium fluoride, niobium pentoxide, barium titanate, tantalum pentoxide, barium sulfate, or glass, etc. The refractive index of the fourth reflective body is preferably higher than the refractive index of the fourth resin. This can facilitate light incident on the fourth resin to be diffuse-reflected by the fourth reflective body. The fourth light reflective member 71 may be a metal member such as aluminum, silver, etc., or a dielectric multilayer film, for example.

The fourth light reflective member 71 is arranged on the upper side of the light source 10. As shown in FIG. 1, the fourth light reflective member 71 is arranged at a position overlapping the light source 10 in the plan view. With this structure, a region directly above the light source 10 can be prevented from becoming excessively bright. Thus, brightness unevenness in the light emitting region is reduced. The fourth light reflective member 71 may have any appropriate shape in the plan view. The shape of the fourth light reflective member 71 in the plan view can be a shape such as a circle, a triangle, a quadrangle, a hexagon, or an octagon, etc., for example.

As shown in FIG. 2, the fourth light reflective member 71 in the present embodiment covers the upper surface of the light source 10 with the light-transmissive member 60 interposed. As shown in FIG. 7A, the fourth light reflective member 71 may be in contact with the upper surface of the light source 10. As shown in FIG. 7B, the fourth light reflective member 71 may comprise a portion that covers the upper surface of the light source 10 with the light-transmissive member 60 interposed, and a portion that is in contact with the upper surface of the light surface 10.

As shown in FIG. 2, the fourth light reflective member 71 may be extended to the upper surface of the light-transmissive member 60, and to above the upper surface 21 of the light guide member 20. The fourth light reflective member 71 may also be arranged at a position that does not overlap the light source 10 in the plan view. For example, to reduce brightness unevenness, it may also be dotted in a region with high brightness of the upper surface 21 of the light guide member 20.

The concentration of the fourth reflective body in the fourth light reflective member is preferably higher than the concentration of the first reflective body in the first light reflective member. Said another way, the concentration of the first reflective body in the first light reflective member is preferably lower than the concentration of the fourth reflective body in the fourth light reflective member. With this structure, the light reflected by the fourth light reflective member is transmitted through the first light reflective member 30 and made incident on the second light reflective member 40. Accordingly, it is possible to increase the amount of light guided to inside the second light reflective member 40. Thus, using total reflection in the second light reflective member 40, it is possible to increase the amount of light guided to regions farther from the light source 10, so it is easier to reduce brightness unevenness of the light emitting module. The concentration of the fourth reflective body in the fourth light reflective member is preferably higher than the concentration of the third reflective body in the third light reflective member. With this structure, it is possible to increase the reflectance of the fourth light reflective member, so that the region directly above the light source 10 can be prevented from becoming excessively bright. As the material of the first reflective body, the third reflective body, and the fourth reflective body, titanium oxide is an example.

Fifth Light Reflective Member 72

The light emitting module 100 may further comprise at least one fifth light reflective member 72. The fifth light reflective member 72 is a member configured to reflect the light emitted by the light source 10. The reflectance of the fifth light reflective member 72 is preferably 60% or greater, and more preferably 80% or greater, for example.

The fifth light reflective member 72 can be constituted by a resin material, and light scattering particles contained in the resin material. As the resin material of the fifth light reflective member 72, it is possible to use a thermoplastic resin such as acrylic resin, polycarbonate resin, cyclic polyolefin resin, polyethylene terephthalate resin or polyester resin, etc., or a thermosetting resin such as epoxy resin or silicone resin, etc., for example. As the light scattering particles of the fifth light reflective member 72, it is possible to use particles such a titanium oxide, silicon dioxide, aluminum oxide, zinc oxide, magnesium oxide, zirconium oxide, yttrium oxide, calcium fluoride, magnesium fluoride, niobium pentoxide, barium titanate, tantalum pentoxide, barium sulfate, or glass, etc., for example. The fifth light reflective member 72 may be a metal member such as aluminum or silver, etc., or a dielectric multilayer film, for example.

The fifth light reflective member 72 is arranged inside the demarcating groove 18. In the present embodiment, the fifth light reflective member 72 is arranged in layered form to follow the inner surface of the demarcating groove 18. The fifth light reflective member 72 may be constituted by a single layer or may be constituted by a laminate of a plurality of layers. The fifth light reflective member 72 may also be filled inside the demarcating groove 18. With the fifth light reflective member 72 being arranged inside the demarcating groove 18, for example, light guiding from a light emission region in a light emitting state to a light emitting region in a non-light emitting state is limited by the fifth light reflective member 72. Accordingly, it is possible to improve the contrast ratio between the light emitting region in the light emitting state and the light emitting region in the non-light emitting state.

Covering Light-Transmissive Member 73

As shown in FIG. 4A, the light emitting module in another embodiment may comprise a light-transmissive member 73 (hereafter referred to as a covering light-transmissive member). The covering light-transmissive member 73 is a member configured to transmit light emitted by the light source 10. The transmittance of the covering light-transmissive member 73 with respect to the peak wavelength of the light source 10 is preferably 60% or greater, and more preferably 80% or greater, for example. As the material of the covering light-transmissive member 73, it is possible to use resin, for example.

The covering light-transmissive member 73 covers the upper surface 21 of the light guide member 20. The refractive index of the covering light-transmissive member 73 is smaller than the refractive index of the light guide member 20. Accordingly, it is possible to make the difference in refractive index between air and the covering light-transmissive member 73 be smaller than the difference in refractive index between air and the light guide member 20. Thus, total reflection at the interface between air and the covering light-transmissive member 73 can be reduced compared to the interface between the air and the light guide member 20. Accordingly, with the covering light-transmissive member 73 covering the upper surface 21 of the light guide member 20, it is possible to improve the light extraction efficiency of the light emitting module. The covering light-transmissive member 73 is preferably positioned between the light source 10 and a portion of the outer edge of the light guide member 20 farthest from the light source 10 in the plan view. The brightness tends be low in a portion of the light guide member 20 far from the light source 10. Accordingly, with the covering light-transmissive member 73 being positioned between the light source 10 and a portion of the outer edge of the light guide member 20 farthest from the light source 10, increase in the brightness near the outer edge of the light guide member 20 farthest from the light source 10 can be facilitated. Thus, brightness unevenness of the light emitting module is reduced. The covering light-transmissive member 73 may also include light scattering particles for adjusting light distribution characteristics. As the light scattering particles of the covering light-transmissive member 73, it is possible to use particles of titanium oxide, silicon dioxide, aluminum oxide, zinc oxide, magnesium oxide, zirconium oxide, yttrium oxide, calcium fluoride, magnesium fluoride, niobium pentoxide, barium titanate, tantalum pentoxide, barium sulfate, or glass, etc., for example.

Support Member 200

The light emitting module 100 is arranged on the support member 200. In the present embodiment, the upper surface of the support member 200 and the lower surface of the third light reflective member 50 face each other. As shown in FIG. 2, the light source 10 is arranged on the support member 200. The first light reflective member 30 and the second light reflective member 40 are arranged between the support member 200 and the light guide member 20.

The support member 200 has a wiring board 80. The wiring board 80 has an insulated base 80A, and a first electrically conductive member 80B arranged on at least one surface of the upper surface and the lower surface of the insulated base 80A. The insulated base 80A may be a rigid board, or may be a flexible board. To make the planar light source 300 smaller in the third direction, it is preferable that the insulated base 80A be a flexible board. The insulated base 80A may be constituted from a single layer in the third direction (Z direction), or may be constituted from a laminate of a plurality of layers. For example, the insulated base 80A may be constituted by a single layer flexible board, or may be constituted by a laminate of a plurality of rigid boards. As the material of the insulated base 80A, it is possible to use a resin such as a polyimide, etc., for example. The first electrically conductive member 80B is a metal film, being a copper film, for example.

The support member 200 may further have a first insulation layer 81. The first insulation layer 81 is arranged on the lower surface of the wiring board 80, and covers the first electrically conductive member 80B. As the material of the first insulation layer 81, it is possible to use epoxy resin, urethane resin, or acrylic resin, for example.

The support member 200 may further have the second electrically conductive member 90. The second electrically conductive member 90 includes, for example, resin, and metal particles contained in the resin. As the resin of the second electrically conductive member 90, it is possible to use epoxy resin or phenol resin, for example. As the metal particles, it is possible to use copper or silver particles, for example.

The second electrically conductive member 90 has a connecting part 90A and a wiring part 90B. The connecting part 90A penetrates the first light reflective member 30, the second light reflective member 40, the third light reflective member 50, and the insulated base 80A in the third direction (Z direction). The wiring part 90B is arranged on the lower surface of the insulated base 80A. The wiring part 90B connects the connecting part 90A and the first electrically conductive member 80B.

A pair of second electrically conductive members 90 are arranged separated from each other corresponding to a pair of positive and negative electrodes 14 of the light source 10. The connecting part 90A of one of the second electrically conductive members 90 is connected with the positive side electrode 14 below the light source 10, and the connecting part 90A of the other electrically conductive member 90 is connected with the negative side electrode 14 below the light source 10. Each of the electrodes 14 of the light source 10 is electrically connected to a respective one of the second electrically conductive member 90 and the first electrically conductive member 80B.

The support member 200 may further have a second insulation layer 91. The second insulation layer 91 covers and protects the lower surface of the second electrically conductive member 90.

The planar light source 300 may also comprise an optical sheet arranged above the light source 10. Examples of the optical sheet include a prism sheet, a light diffusion sheet, etc. The optical sheet may be in contact with or may be separated from the fourth light reflective member 71. When the optical sheet and the fourth light reflective member 71 are in contact with each other, it is possible to reduce the size of the planar light source 300 in the third direction. When the optical sheet and the fourth light reflective member 71 are separated from each other, it is possible to prevent chipping the fourth light reflective member 71. The optical sheet may be in contact with or may be separated from the light guide member 20. When the optical sheet and the light guide member 20 are in contact with each other, it is possible to reduce the size of the planar light source 300 in the third direction. When the optical sheet and the light guide member 20 separate from each other, it is possible to prevent chipping of the light guide member 20. It is also possible to arrange a layer of air between the optical sheet and the light guide member 20. With this structure, the light from the light source is totally reflected at the interface between the optical sheet and the air, which allows for facilitating guiding light from the light source 10 to regions farther away.

Next, with reference to FIG. 8A to FIG. 9G, an example of the method for manufacturing the planar light source 300 is explained.

Figure 8A:
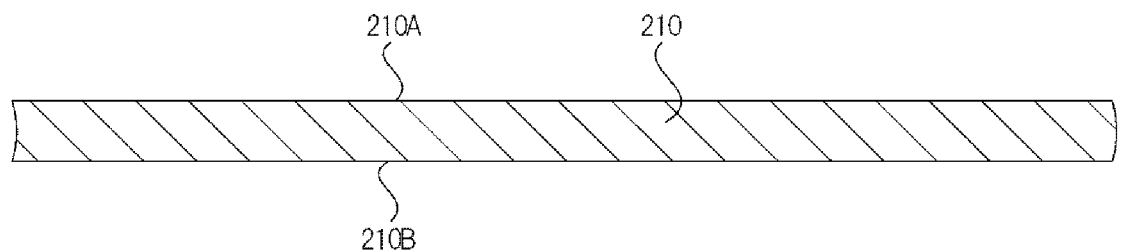
FIG. 8A is a schematic cross section view showing a method for manufacturing the planar light source of one embodiment of the present invention.

A light guide plate 210 shown in FIG. 8A is prepared by purchasing, etc. The light guide plate 210 includes a first surface 210A and a second surface 210B positioned at the side opposite the first surface 210A.

Figure 8B:
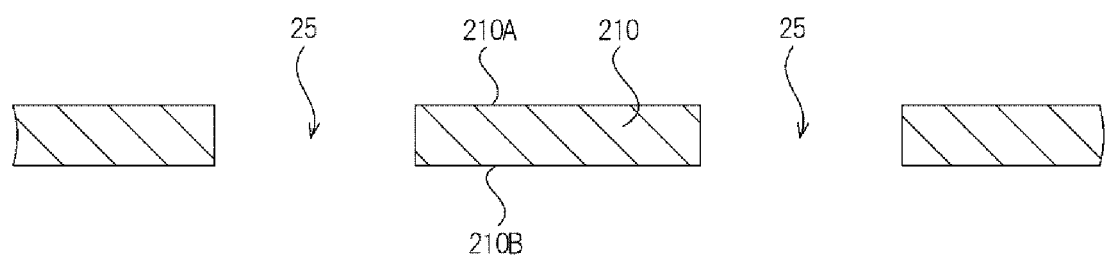
FIG. 8B is a schematic cross section view showing the method for manufacturing the planar light source of one embodiment of the present invention.

As shown in FIG. 8B, the hole 25 is formed in the light guide plate 210. The hole 25 can be formed by drilling, punching, or laser machining, for example. Members described as being obtained from each step may also be prepared by being purchased. For example, the light guide plate 210 in which the hole 25 is formed shown in FIG. 8B can be prepared by being purchased. In the description of each step to be given below, the expression that a member described as being obtained from each step may also be prepared by being purchased will be omitted as appropriate.

Figure 8C:
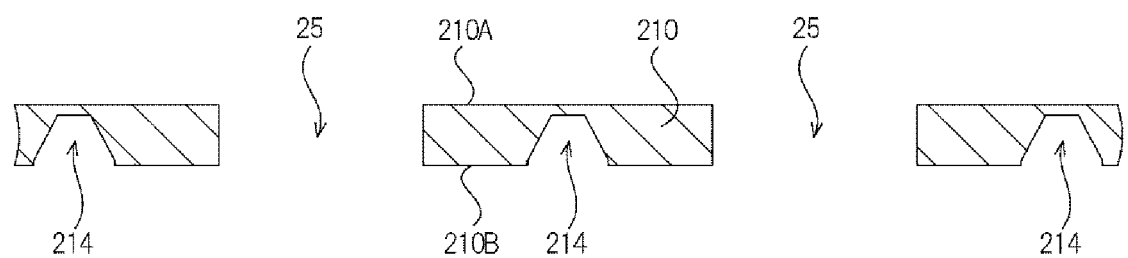
FIG. 8C is a schematic cross section view showing the method for manufacturing the planar light source of one embodiment of the present invention.

As shown in FIG. 8C, a groove part 214 is formed in the light guide plate 210. The groove part 214 is formed as a groove having a bottom and open at the second surface 210B side. The groove part 214 is formed by cutting or laser machining, for example.

Figure 8D:
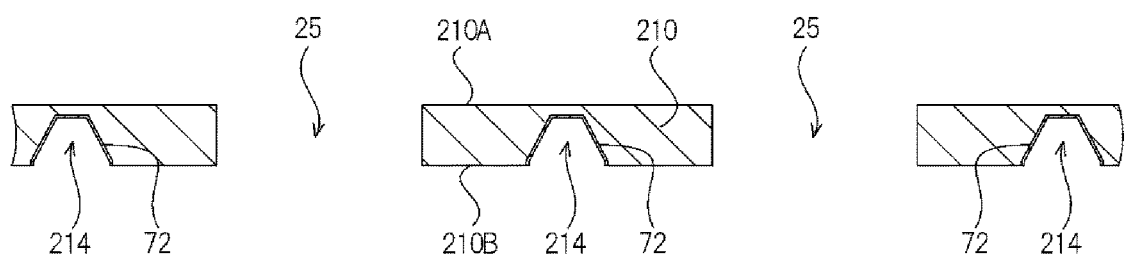
FIG. 8D is a schematic cross section view showing the method for manufacturing the planar light source of one embodiment of the present invention.

As shown in FIG. 8D, the fifth light reflective member 72 is formed inside the groove part 214 of the light guide plate 210. The fifth light reflective member 72 is formed using a known method such as spraying, printing, or potting, etc. When the fifth light reflective member 72 is formed by spraying, it is possible to mask the surface of the light guide plate 210 so as to not have the fifth light reflective member 72 formed on parts where it is unnecessary.

Figure 8E:
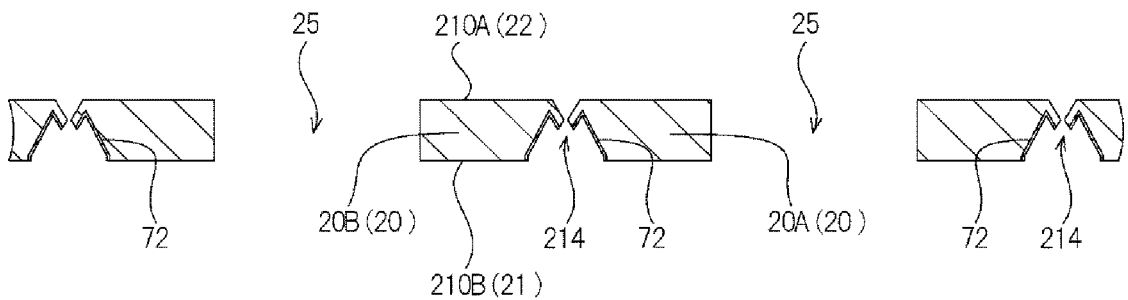
FIG. 8E is a schematic cross section view showing the method for manufacturing the planar light source of one embodiment of the present invention.

As shown in FIG. 8E, the portion connected by the bottom surface part of the groove part 214 in the light guide plate is cut. As a result, it is possible to separate the light guide plate into the first light guide part 20A and the second light guide part 20B. The light guide plate after being separated into the first light guide part 20A and the second light guide part 20B is sometimes referred to as the light guide member 20. For the cutting, it is possible to use a known member such as a blade. By cutting the bottom surface part of the groove part 214 facing the second surface 210B side from the first surface 210A side, a portion of the bottom surface part of the cut groove part 214 may be inclined at the second surface 210B side. By separating the light guide plate into a plurality of light guide members 20, it is possible to reduce warping of the light guide plate due to heat compared to when the light guide plate is connected by the groove part 214.

Figure 9A:
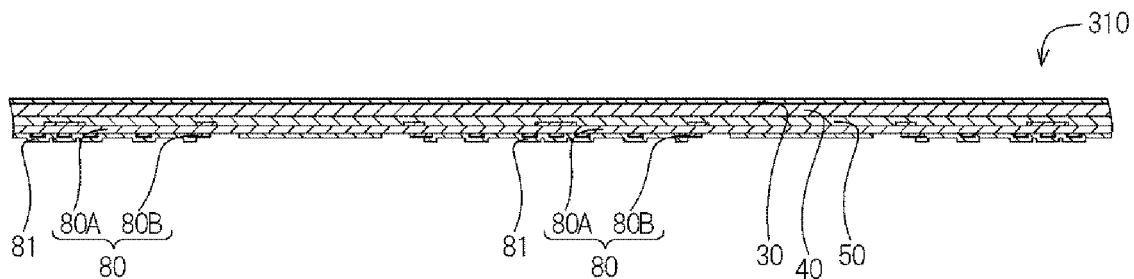
FIG. 9A is a schematic cross section view showing the method for manufacturing the planar light source of one embodiment of the present invention.

A laminated member 310 shown in FIG. 9A is prepared by purchasing, etc. The laminated member 310 comprises the wiring board 80, the third light reflective member 50 arranged on the wiring board 80, the second light reflective member 40 arranged on the third light reflective member 50, and the first light reflective member 30 arranged on the second light reflective member 40. The step of preparing the laminated member 310, after preparing the wiring board 80 by purchasing, etc., may include a step for arranging the third light reflective member 50 on the wiring board 80, a step for arranging the second light reflective member 40 on the third light reflective member 50, and a step for arranging the first light reflective member 30 on the second light reflective member 40. Members described as being obtained from each step may also be prepared by being purchased. In the description of each step to be given below, the expression that a member described as being obtained from each step may also be prepared by being purchased will be omitted as appropriate. The laminated member 310 may further comprise the first insulation layer 81 covering the lower surface of the wiring board 80.

Figure 9B:
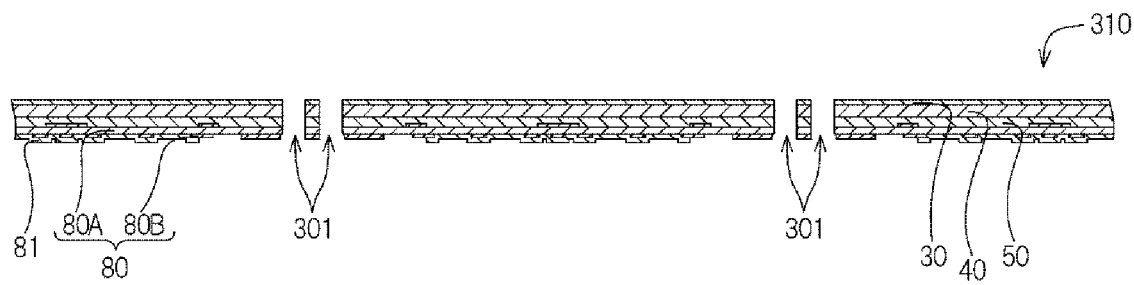
FIG. 9B is a schematic cross section view showing the method for manufacturing the planar light source of one embodiment of the present invention.

As shown in FIG. 9B, the through hole 301 that penetrates the first light reflective member 30, the second light reflective member 40, the third light reflective member 50, the wiring board 80, and the first insulation layer 81 is formed in the laminated member 310. The through hole 301 is formed by punching, drilling, or laser machining, for example. The shape of the through hole 301 in the plan view is a circle shape. Besides the circle shape, the shape of the through hole 301 in the plan view may also be an oval shape or a polygon shape. In the through holes 301, one through hole 301 is arranged to face one electrode (e.g. the positive electrode) of the pair of positive and negative electrodes of the light source, and one through hole 301 to face the other electrode (e.g. the negative electrode). In the plan view, one through hole 301 overlaps at least a portion of one electrode.

Figure 9C:
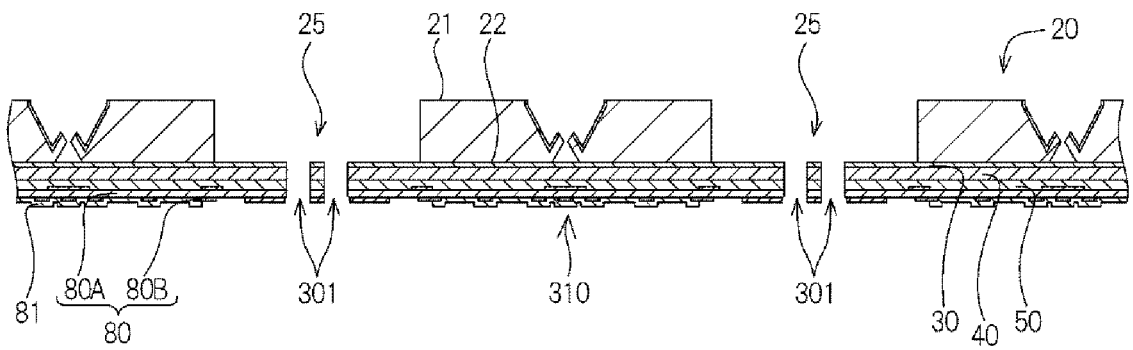
FIG. 9C is a schematic cross section view showing the method for manufacturing the planar light source of one embodiment of the present invention.

As shown in FIG. 9C, the light guide member 20 is arranged on the laminated member 310 in which the through hole 301 is formed. The lower surface 22 of the light guide member 20 faces the upper surface of the first light reflective member 30. The through hole 301 formed in the laminated member 310 is arranged to overlap the hole 25 formed in the light guide member 20. In the plan view, the hole 25 and the two through holes 301 overlap.

Figure 9D:
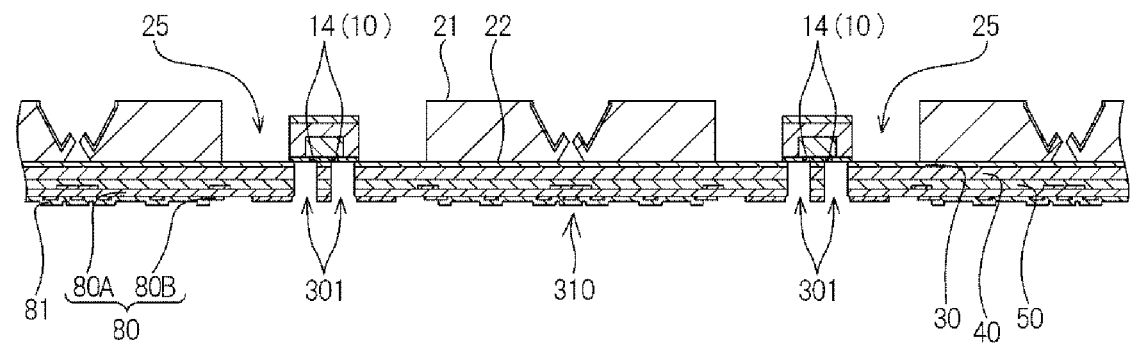
FIG. 9D is a schematic cross section view showing the method for manufacturing the planar light source of one embodiment of the present invention.

As shown in FIG. 9D, the light source 10 is arranged inside the hole 25. The lower surface of the light source 10 and the upper surface of the first light reflective member 30 are facing. The light source 10 is arranged so that the electrodes 14 of the light source 10 and the through holes 301 formed in the laminated member 310 overlap in the plan view.

Figure 9E:
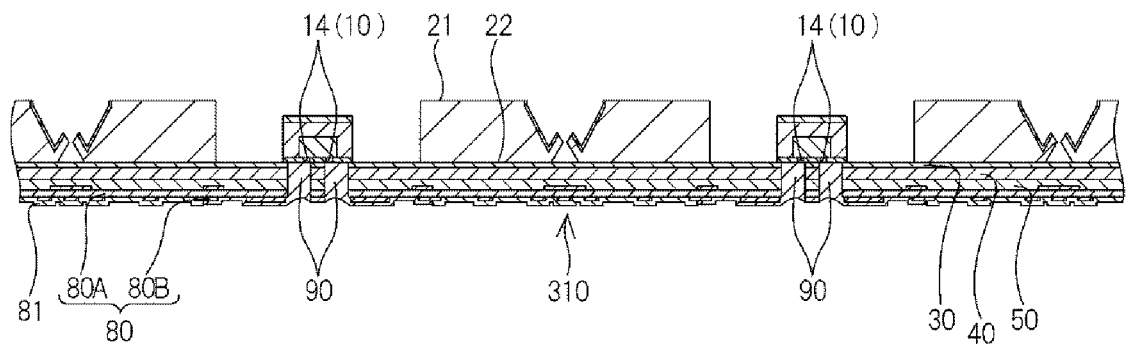
FIG. 9E is a schematic cross section view showing the method for manufacturing the planar light source of one embodiment of the present invention.

After the light source 10 is arranged inside the hole 25, the second electrically conductive member 90 is formed inside the through hole as shown in FIG. 9E. By hardening an electrically conductive paste, for example, after it is arranged inside the through hole, it is possible to form the second electrically conductive member 90 connected with the electrode 14 of the light source 10. The second electrically conductive member 90 is also formed on the lower surface of the wiring board 80, and is connected to the first electrically conductive member 80B of the wiring board 80.

Figure 9F:
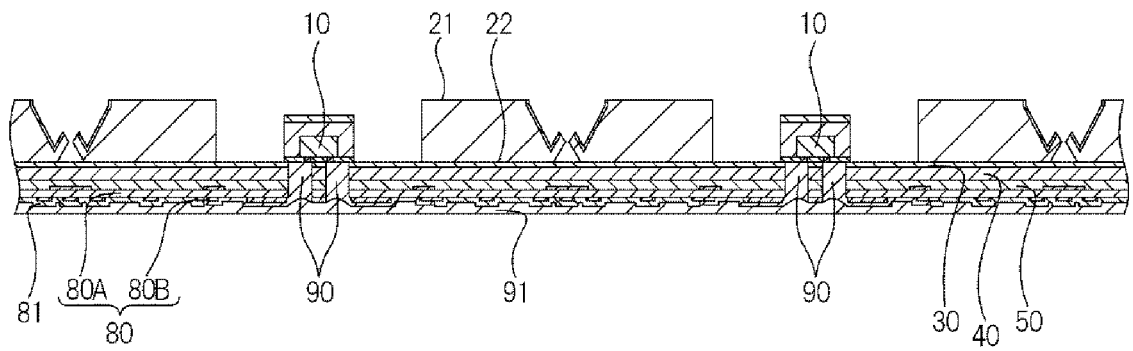
FIG. 9F is a schematic cross section view showing the method for manufacturing the planar light source of one embodiment of the present invention.

As shown in FIG. 9F, the second insulation layer 91 that covers the lower surface of the second electrically conductive member 90 is formed. The second insulation layer 91 can be formed using a method such as printing, potting, spraying, ink jet, or resin sheet adhesion, etc., for example.

Figure 9G:
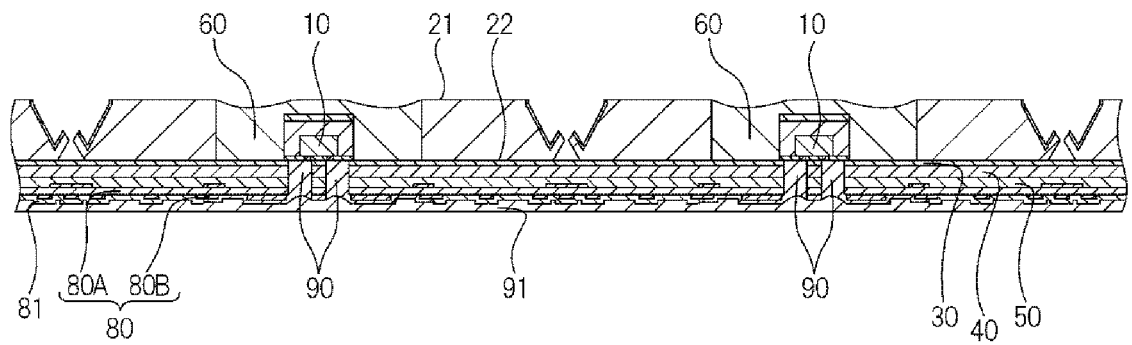
FIG. 9G is a schematic cross section view showing the method for manufacturing the planar light source of one embodiment of the present invention.

After forming the second insulation layer 91, the light-transmissive member 60 that covers the light source 10 inside the hole is formed as shown in FIG. 9G. The light-transmissive member 60 is formed to cover the lateral surface of the light source 10. For example, after supplying a liquid form light-transmissive resin into the hole 25, by heating and curing the light-transmissive resin, it is possible to form the light-transmissive member 60.

After forming the light-transmissive member 60, it is possible to manufacture the planar light source 300 shown in FIG. 2 by forming the fourth light reflective member 71 that covers the light-transmissive member 60. The fourth light reflective member 71 is formed using a method such as printing, potting, spraying, ink jet, or resin sheet adhesion, etc., for example. The method for manufacturing the planar light source 300 shown above is one example, and various modifications are possible provided there is no technical contradiction.

Certain embodiments of the present invention has been explained with reference to specific examples. However, the present invention is not limited to these specific examples. Based on the embodiments of the present invention described above, all modes that can be implemented with suitable design changes by a person skilled in the art belong the scope of the present invention provided they include the gist of the present invention. In addition, in the scope of the idea of the present invention, a person skilled in the art can come up with various modification examples and revision examples, and those modification examples and revision examples are also within the scope of the present invention.

What is claimed is:

1. A light emitting module comprising:
   a light source;
   a light guide member configured to transmit light from the light source, the light guide member having an upper surface and a lower surface opposite to the upper surface, the light guide member defining a hole with the light source being arranged inside the hole;
   a first light reflective member arranged on a lower surface side of the light guide member, the first light reflective member having a lower surface, the first light reflective member including
      a first resin, and
      a first reflective body having a refractive index higher than a refractive index of the first resin; and
   a second light reflective member arranged on a lower surface side of the first light reflective member, the second light reflective member including
      a second resin, and
      a second reflective body having a refractive index lower than a refractive index of the second resin.

2. The light emitting module according to claim 1, wherein the first reflective body is titanium oxide.

3. The light emitting module according to claim 1, wherein the second reflective body is a gas.

4. The light emitting module according to claim 1, wherein
   the refractive index of the first resin is lower than a refractive index of the light guide member.

5. The light emitting module according to claim 1, wherein
   the first resin is one of an acrylic resin, a silicone resin, a urethane resin, and an epoxy resin.

6. The light emitting module according to claim 1, wherein
   the second resin is one of a polyethylene terephthalate resin, an olefin resin, an acrylic resin, a silicone resin, a urethane resin, and an epoxy resin.

7. The light emitting module according to claim 1, wherein
   a thickness of the second light reflective member is greater than a thickness of the first light reflective member.

8. The light emitting module according to claim 1, wherein
   in a plan view, the first light reflective member is positioned between the light source and a portion of an outer edge of the light guide member farthest from the light source.

9. The light emitting module according to claim 1, wherein
   the first light reflective member faces the lower surface of the light guide member and a lower surface of the light source.

10. The light emitting module according to claim 1, wherein
the second light reflective member faces an entire lower surface of the first light reflective member.

11. The light emitting module according to claim 1, wherein
the hole is a through hole extending from the upper surface to the lower surface of the light guide member.

12. The light emitting module according to claim 1, further comprising
a third light reflective member arranged on a lower surface side of the second light reflective member, the third light reflective member including
a third resin, and
a third reflective body having a higher refractive index than the third resin.

13. The light emitting module according to claim 12, wherein
a concentration of the third reflective body in the third light reflective member is higher than a concentration of the first reflective body in the first light reflective member.

14. The light emitting module according to claim 12, further comprising
a fourth light reflective member arranged on an upper side of the light source, the fourth light reflective member including
a fourth resin, and
a fourth reflective body having a higher refractive index than the fourth resin.

15. The light emitting module according to claim 14, wherein
a concentration of the first reflective body in the first light reflective member is lower than a concentration of the fourth reflective body in the fourth light reflective member.

16. The light emitting module according to claim 1, wherein
the first light reflective member includes a plurality of light reflective particles constituting the first reflective body, the light reflective particles being dispersed in the first resin.

17. The light emitting module according to claim 1, wherein
the light guide member further defines a light guide hole arranged between the hole and an outer edge of the light guide member in a plan view.

18. A planar light source comprising:
the light emitting module according to claim 1; and
a support member, wherein
the first light reflective member and the second light reflective member are arranged between the support member and the light guide member.

19. The light emitting module according to claim 1, further comprising
an additional light reflective member arranged on one of
a lower surface side of the second light reflective member, and
an upper side of the light source,
the additional light reflective member including
a resin material, and
an additional reflective body having a higher refractive index than the resin material.

20. The light emitting module according to claim 19, wherein
a concentration of the additional reflective body in the additional light reflective member is higher than a concentration of the first reflective body in the first light reflective member.

* * * * *